United States Patent
Adler et al.

(10) Patent No.: US 12,175,515 B2
(45) Date of Patent: Dec. 24, 2024

(54) MANAGING ITEM OPTIONS FOR DISTRIBUTION EFFICIENCY

(71) Applicant: DOORDASH, INC., San Francisco, CA (US)

(72) Inventors: Nicholas Martin Adler, San Francisco, CA (US); Amandeep Manik, San Francisco, CA (US); Avlok Kohli, San Francisco, CA (US); Pui Wai Kwong, Philadelphia, PA (US)

(73) Assignee: DOORDASH, INC., San Francisco, CA (US)

( * ) Notice: Subject to any disclaimer, the term of this patent is extended or adjusted under 35 U.S.C. 154(b) by 235 days.

(21) Appl. No.: 17/718,681

(22) Filed: Apr. 12, 2022

(65) Prior Publication Data

US 2022/0237680 A1 Jul. 28, 2022

Related U.S. Application Data

(62) Division of application No. 15/924,893, filed on Mar. 19, 2018, now Pat. No. 11,308,536.

(51) Int. Cl.
G06Q 30/00 (2023.01)
G06Q 10/083 (2023.01)
G06Q 30/0601 (2023.01)

(52) U.S. Cl.
CPC ....... *G06Q 30/0629* (2013.01); *G06Q 10/083* (2013.01); *G06Q 30/0643* (2013.01)

(58) Field of Classification Search
CPC ............. G06Q 30/0629; G06Q 10/083; G06Q 30/0643
See application file for complete search history.

(56) References Cited

U.S. PATENT DOCUMENTS 6,675,153 B1 1/2004 Cook et al.
8,275,359 B2 9/2012 Drennan
(Continued)

FOREIGN PATENT DOCUMENTS

WO 01/11523 A1 2/2001
WO 2009048988 A2 4/2009
(Continued)

OTHER PUBLICATIONS

"Nancy Kruse, Bret Thorne Discuss Meal Kit Services," by Bret Thorne, Nation's Restaurant News, Lebhar-Friedman, Inc., Aug. 13, 2015 (Year: 2015).*
(Continued)

*Primary Examiner* — Anne M Georgalas
(74) *Attorney, Agent, or Firm* — MATTINGLY & MALUR, PC

(57) ABSTRACT

In some examples, a computer may receive, from a buyer application on a buyer device, an indication that the buyer has accessed information related to a first merchant of a plurality of merchants. The computer may send a communication to a merchant application on a merchant computing device of the first merchant to determine a current backlog of orders for the first merchant. Based at least partially on receiving an indication that the current backlog exceeds a threshold, the computer may send, to the buyer application, item information that causes the buyer application to present, in a user interface, information indicating availability of a meal kit for a menu item offered by the first merchant. The computer may receive a selection via the user interface indicating an order for the meal kit and may send a communication to the merchant application to indicate the order for the meal kit.

20 Claims, 13 Drawing Sheets

(56) References Cited

U.S. PATENT DOCUMENTS

| | | | |
|---|---|---|---|
| 10,366,434 B1* | 7/2019 | Belousova | G06Q 50/12 |
| 10,366,436 B1* | 7/2019 | Kumar | G06Q 10/087 |
| 10,769,523 B2 | 9/2020 | Eyster et al. | |
| 10,810,652 B2* | 10/2020 | Laye | G06Q 30/0635 |
| 2009/0094121 A1 | 4/2009 | Newhouse et al. | |
| 2009/0106124 A1 | 4/2009 | Yang | |
| 2009/0266722 A1 | 10/2009 | Rogers et al. | |
| 2011/0320034 A1 | 12/2011 | Dearlove et al. | |
| 2012/0030067 A1* | 2/2012 | Pothukuchi | G06Q 10/087 |
| | | | 705/28 |
| 2012/0290377 A1* | 11/2012 | Itani | G06Q 30/0603 |
| | | | 705/26.7 |
| 2013/0132140 A1 | 5/2013 | Amin et al. | |
| 2013/0226651 A1* | 8/2013 | Napper | G06Q 20/3224 |
| | | | 701/527 |
| 2013/0290172 A1 | 10/2013 | Mashinsky | |
| 2014/0129951 A1 | 5/2014 | Amin et al. | |
| 2014/0149269 A1 | 5/2014 | Kantarjiev et al. | |
| 2014/0188750 A1 | 7/2014 | Seller | |
| 2014/0330739 A1 | 11/2014 | Falcone et al. | |
| 2015/0120602 A1 | 4/2015 | Huffman et al. | |
| 2015/0242819 A1 | 8/2015 | Moses et al. | |
| 2015/0254758 A1* | 9/2015 | Wadhawan | G06Q 30/0603 |
| | | | 705/26.7 |
| 2015/0262121 A1* | 9/2015 | Riel-Dalpe | G06Q 50/12 |
| | | | 705/15 |
| 2016/0012513 A1 | 1/2016 | Martinez | |
| 2016/0063435 A1 | 3/2016 | Shah et al. | |
| 2016/0071050 A1 | 3/2016 | Kaye | |
| 2016/0071190 A1* | 3/2016 | Voelz | G06Q 10/083 |
| | | | 705/26.81 |
| 2016/0203431 A1 | 7/2016 | Renfroe | |
| 2016/0223345 A1 | 8/2016 | Thakur et al. | |
| 2016/0232489 A1 | 8/2016 | Skaaksrud | |
| 2016/0328781 A1 | 11/2016 | Patel-Zellinger et al. | |
| 2016/0350837 A1 | 12/2016 | Williams et al. | |
| 2017/0046644 A1 | 2/2017 | Zhang et al. | |
| 2017/0098264 A1* | 4/2017 | Priebatsch | H04L 67/52 |
| 2017/0116566 A1 | 4/2017 | Walton | |
| 2017/0116570 A1 | 4/2017 | Schroeder et al. | |
| 2017/0147951 A1 | 5/2017 | Meyer et al. | |
| 2017/0300956 A1 | 10/2017 | Cantrell et al. | |
| 2017/0330123 A1 | 11/2017 | Deshpande et al. | |
| 2018/0025407 A1 | 1/2018 | Zhang et al. | |
| 2018/0247228 A1 | 8/2018 | Kattil Veetil | |

FOREIGN PATENT DOCUMENTS

| | | |
|---|---|---|
| WO | 2015/164264 A1 | 10/2015 |
| WO | 2017003874 A1 | 1/2017 |

OTHER PUBLICATIONS

"The Grocerant: How smart grocery stores are becoming hybrids," Sylvain Charlebois, The Canadian Press [Toronto], Nov. 2, 2017 (Year: 2018).*

Notice of Allowance mailed May 6, 2019, for U.S. Appl. No. 15/078,837, of Liu, X., et al., filed Mar. 23, 2016.

Non-Final Office Action mailed May 29, 2019, for U.S. Appl. No. 14/811,924, of Wolter, JA, et al., filed Jul. 29, 2015.

Final Office Action mailed May 30, 2019, for U.S. Appl. No. 15/081,113, of Bhoranla, J., et al., filed Mar. 25, 2016.

Final Office Action Mailed Jun. 3, 2019, for U.S. Appl. No. 15/081,066, of Bhorania, J., et al., filed Mar. 25, 2016.

Non-Final Office Action mailed Mar. 8, 2018, for U.S. Appl. No. 14/811,924, of Wolter, J.A., et al., filed Jul. 29, 2015.

Non-Final Office Action mailed Oct. 18, 2018, for U.S. Appl. No. 15/081,066, of Bhorania, J., et al., fied Mar. 25, 2016.

Non-Final Office Action mailed Oct. 23, 2018, for U.S. Appl. No. 15/081,113, of Bhorania, J., et al., filled Mar. 25, 2016.

Final Office Action mailed Nov. 2, 2018, for U.S. Appl. No. 14/811,924, of Wolter, J.A., et al., filed Jul. 29, 2015.

Non-Final Office Action mailed Nov. 28, 2018, for U.S. Appl. No. 15/078,837, of Liu, X., et al., filed Mar. 23, 2016.

"Made to Order," by Demitri Diakantonis, Mergers and Acquisitions 52.10: 42-47, 49. Middle Market Information LLC (Nov./Dec. 2017) (Year: 2017).

"This New Meal Kit Service is Literally Half the Price of Blue Apron," by Sage Lazzaro, The New York Observer (New York, NY), Jul. 11, 2017 (Year: 2017).

"Subscription meal-planning tool expands countrywide," by Jon Springer, Supermarket News Informa, Jun. 10, 2017 (Year: 2017).

"Hello Fresh is Getting Boozy with the Launch of a Wine of the Month Club," by Sage Lazzaro, The New York Observer (New York, NY), May 12, 2017 (Year: 2017).

"From dog food to makeup: Are subscription services the future of retail?". Telegraph.co.uk (London), Mar. 17, 2018 (Year: 2018).

"8 things to know before trying a meal subscription plan," by Robert Rodriguez, The Tuscaloosa News (Tuscaloosa, Alabama), Oct. 29, 2015 (Year: 2015).

* cited by examiner

MANAGING ITEM OPTIONS FOR DISTRIBUTION EFFICIENCY

CROSS-REFERENCE TO RELATED APPLICATION

This application is a divisional application of, and claims priority to, U.S. patent application Ser. No. 15/924,893, filed Mar. 19, 2018, issued as U.S. Pat. No. 11,308,536, and which is incorporated by reference herein.

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. Furthermore, typically, people order meals for delivery as a one-time service to be delivered on the same day for immediate consumption, which can create inefficiencies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
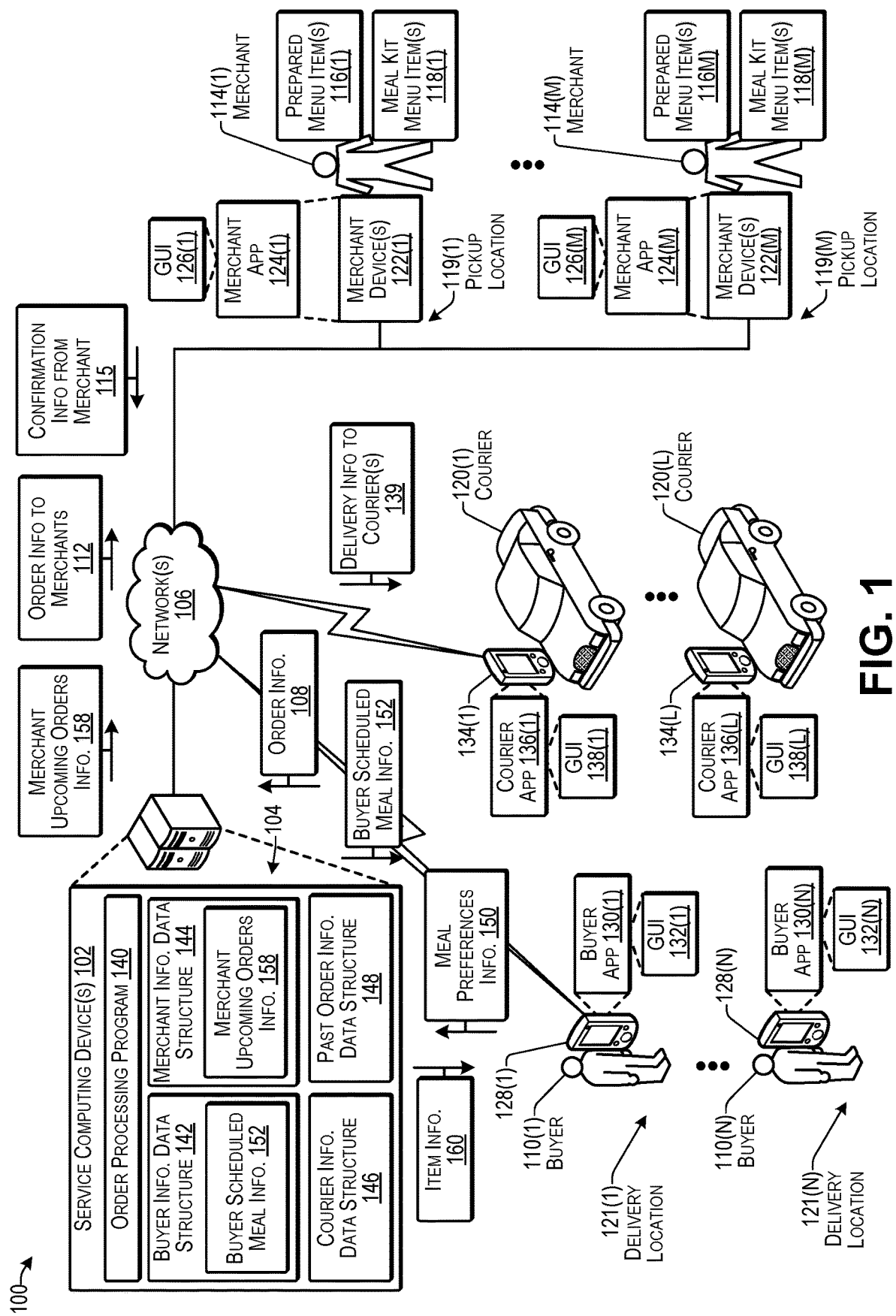
FIG. 1 illustrates an example distributed system enabling management of menu item options for distribution efficiency according to some implementations.

The technology herein provides novel arrangements and techniques for logistical management using a distributed network of merchant devices, buyer devices and courier devices. In some examples, an order processing program executing on a service computing device of a service provider may provide a service that enables buyers to automatically receive scheduled meals for selected days of the week. For instance, the order processing program may provide item information to a buyer application on a buyer device for each buyer registered for the scheduled meal service. The buyer application may present a graphical user interface (GUI) to the buyer that shows information related to the menu items that the buyer is scheduled to receive for the upcoming week. As one example, the GUI may indicate, for each selected day, the menu item description, the merchant who is the source of the menu item, a specified delivery time window, a delivery location, a number of servings to be delivered, and so forth. In addition, the GUI may enable the buyer to select one or more alternative menu items, select a meal kit menu item instead of a prepared menu item in some cases, specify dietary preferences, specify any food allergies, view nutritional information, and the like.

The buyer may have the option to elect not to receive a scheduled meal on one or more days. In some cases, the buyer may be able to opt out of receiving a scheduled meal within a threshold period of time before the meal is scheduled to be delivered. For instance, a default action of the service may be to provide the top recommended meal for each day for which the buyer is scheduled to receive unless the buyer opts out before the threshold time limit is reached. Additionally, after the meal is delivered to the buyer during the specified time window, an account of the buyer may be charged, such as via a stored payment method. The service provider may negotiate with the merchants for bulk pricing discounts for menu items purchased as part of the service. Further, because the menu items are scheduled in advance, such as based on a time corresponding based at least partially on the threshold time limit, a sufficient number of couriers may be scheduled for delivering the menu items, and the merchants may have sufficient notice to obtain sufficient ingredients and schedule sufficient staff to prepare the meals. For example, the couriers may be able to deliver multiple prescheduled menu items from the selected merchants to buyer delivery locations that are within a threshold distance of each other. Thus, through the techniques herein, system efficiency is improved, and the service provider is able to reduce the costs of preparing and delivering the menu items to the buyers, allowing lower fees to be charged to the buyers. In addition, in some cases, a buyer may elect to receive an uncooked or otherwise partially prepared meal, i.e., a meal kit, prepared by the merchant and delivered to the buyer, which may provide the buyer with the option of receiving the meal kit and preparing the meal subsequently at a later time, if so desired.

In addition, in other examples, the service provider may maintain one or more service computing devices that execute an order processing program to determine when it would be optimal to substitute a meal kit for a precooked meal for a particular buyer who is using the buyer application for ordering a meal, such as for immediate delivery. For instance, the service computing device may receive, from the buyer application executing on the buyer device, an indication that a buyer has accessed the buyer application on the buyer device. The buyer application may include functionality for presenting a GUI to enable the buyer to order respective cooked or otherwise substantially fully prepared menu items from respective merchants of a plurality of merchants. Further, the buyer application may indicate to the service computing device that the buyer has selected, via the GUI, information related to a menu item offered by a selected merchant of the plurality of merchants.

In response to the communication from the buyer application regarding the buyer's selection or potential selection from the selected merchant, the order processing program on the service computing device may send a communication to a merchant application executing on merchant computing device associated with the selected merchant to determine a current backlog of orders for the selected merchant. Based at least partially on receiving a reply communication from the merchant application indicating that the current backlog of orders for the selected merchant exceeds a threshold, the order processing program may send, to the buyer application, item information that causes the buyer application to present, in the GUI, information indicating availability of a meal kit for the menu item offered by the selected merchant in place of the prepared menu item. As one example, the GUI may indicate that the meal kit is currently available for order and that the prepared menu item is available for order with delayed delivery based on the backlog. As another example, the GUI may indicate that the meal kit is available at a reduced price and/or at an earlier delivery time, as compared to the prepared item, to incentivize the buyer to select the meal kit. As still another example, the GUI may indicate that the meal kit is available and the prepared item is currently unavailable so that the only choice presented to the buyer is selection of the meal kit.

Suppose that the buyer decides to select the meal kit option, and uses the GUI on the buyer device to make the selection. The order processing program may receive, from the buyer application, the selection received via the GUI indicating the order for the meal kit. In response, the order processing program may send a communication to the merchant application to indicate the order received for the meal kit. Furthermore, the order processing program may send a communication to a courier device associated with a courier to instruct the courier to pick up the meal kit from the merchant pickup location and deliver the meal kit to a delivery location indicated by the buyer. For example, the merchant may have a number of meal kits already prepared and the courier may be able to pick up the meal kit immediately from the merchant for delivery to the delivery location specified by the buyer.

In addition, if a courier is already scheduled to deliver a cooked meal in the vicinity of the buyer delivery location, the courier may also deliver the meal kit during the same delivery run with little concern of spoilage of the meal kit due to generally longer spoilage times for meal kits. Further, in some cases, the buyer who orders the meal kit may receive a discount in the delivery fee or free delivery since the delivery may often be batched with other deliveries by a courier to the same vicinity of the buyer.

The technology herein employs a plurality of computing devices, mobile devices, location sensors, and the like, to provide a novel distributed network of devices that enables merchants to receive and prepare buyer orders, enables couriers to pick up and deliver buyer orders, and enables buyers to place and receive orders for items. For example, a service provider may provide a delivery service that enables buyers to preschedule deliveries of items, such as menu items or other goods, from merchants, such as restaurants. When placing orders for the menu items, the buyer may use the buyer application executing on a buyer device, such as a mobile device or other computing device, to browse through the items available from various different merchants. The buyer may select a particular item to order from a particular merchant and the service may send information about this selection to the particular merchant. Further, the service may arrange for a courier to pick up the ordered item from the merchant and deliver the item to the buyer.

In addition, the merchants that participate in the scheduled meal service herein may be notified in advance by the order processing program of a number of orders of a particular menu item that are required for a selected day. Furthermore, if a selected merchant has multiple locations within a service region, the orders for a particular day may be distributed among the multiple locations to reduce the burden on any single location of the multiple locations. Further, because the delivery locations are known in advance, the orders may be distributed among the multiple merchant locations of the selected merchant based at least partially on proximity of the merchant locations to the delivery locations of the buyers who will receive the menu items. Additionally, the advanced notice provided by the order processing program provides the selected merchants with ample opportunity to schedule sufficient staffing and acquire sufficient ingredients for the ordered number of menu items. Further, in the case that the selected menu items are conducive to being prepared as meal kits, the merchants may prepare a number of the menu items as meal kits in advance, and may either provide the items as meal kits, or may use the meal kits themselves to cook the prepared menu items.

In addition, delivery of meal kits by couriers may usually be more efficient than delivery of prepared items. For example, because meal kits may typically be kept cold, rather than hot, the spoilage time for a meal kit may normally be much longer than the spoilage time for a prepared meal. Accordingly, a courier may carry a large number of meal kits in a cooler for making a large number of deliveries and/or for making deliveries to a service area that is substantially larger than a service area for delivering hot prepared meals. Further, because the meal kits may last several days in a refrigerator, in some examples, the merchant may prepare a certain number of meal kits each day and may provide the meal kits on a first-in-first-out basis without worrying about waste due to unused meal kits. Additionally, meal kits may be prepared in off-peak times, e.g., between 2:00 PM and 5:00 PM during the day when the restaurant is normally not busy.

From a buyer's perspective, ordering a meal kit rather than a prepared meal may be useful in several situations, such as when the buyer would like to receive delivery of the meal in advance of the time at which the meal will be consumed. For example, suppose that the buyer would like to receive delivery of a meal kit at 1:00 PM for consumption that night, rather than having to be present at the delivery location at a particular time that night. As another example, if the merchant has a backlog of orders, e.g., at 6:30 PM, and the buyer is trying to order a particular item, the buyer may be able to receive a meal kit for immediate delivery, rather than having to wait for an extended period of time to receive a fully prepared item. In some examples herein, the buyer application may include a GUI with a meal kit section in which the buyer is able to browse just for meal kits available from local merchants.

As used herein, an order may include a request submitted by a buyer (e.g., a customer) for the acquisition of menu items and/or other goods (referred to herein as items) from a merchant. The order information may be received by the service and sent to the merchant. For example, a merchant may include a restaurant or any other business or other entity engaged in the offering of items to be provided to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of enabling buyers to preschedule orders with merchants for menu items that may be prepared item or meal kits. However, implementations herein are not limited to the particular examples provided, and may be extended to other service environments, other system architectures, other types of goods, other scheduling options, other conditions, and so forth, as will be apparent to those of skill in the art in light of the disclosure herein.

FIG. 1 illustrates an example distributed system 100 enabling management of item options for distribution efficiency according to some implementations. The distributed system 100 includes one or more service computing devices 102 of a service provider 104 that may communicate, over one or more networks 106, with a plurality of buyers 110(1)-110(N), such as for receiving order information 108. Further, the one or more service computing devices 102 may communicate over the one or more networks 106 with a plurality of merchants 114(1)-114(M), such as for sending order information 112 to the merchants 114 and for receiving confirmation information 115 from the merchants 114.

In this example, the merchants 114(1)-114(M) may provide prepared menu items 116(1)-116(M) and meal kit menu items 118(1)-118(M), respectively. For instance, each merchant 114 may offer respective menu items 116 and 118, which may be ordered by buyers 110 for delivery (or in some other examples, for dine-in or takeout). For instance, an ordered menu item 116 or 118 may be picked up from a pickup location 119(1)-119(M) of a respective merchant 114(1)-114(M) by a selected courier 120 of a plurality of couriers 120(1)-120(L), and delivered to a delivery location 121(1)-121(N) of a respective buyer 110(1)-110(N).

In the illustrated example, the service computing device 102 of the service provider 104 is able to communicate with a plurality of merchant devices 122(1)-122(M) over the one or more networks 106. Each merchant device 122(1)-122(M) may be associated with a respective merchant 114(1)-114(M). Each merchant device 122(1)-122(M) may be a computing device, such as a desktop, laptop, tablet, smart phone, or the like, as additionally enumerated elsewhere herein, and may include a respective instance of a merchant application 124(1)-124(M) that executes on the respective merchant device 122(1)-122(M). For example, the merchant application 124 may be configured to communicate with the service computing device 102, such as for receiving the order information 112 and for sending the order confirmation information 115. In some examples, the merchant application 124 and the service computing device 102 may communicate with each other via one or more application programming interfaces (APIs). Further, the merchant device 122 may include one or more output devices, such as speakers (not shown in FIG. 1) or a kitchen ticket printer, that the merchant application 124 may use to audibly notify the respective merchant 114 that an order has been received or automatically print the order. Additionally, or alternatively, the merchant device 122 may include a display (not shown in FIG. 1) that the merchant application 124 may use for presenting order information and the like to the merchant 114. For instance, the merchant application 124 on the merchant device 122 may present the order information 112 to the merchant 114 in a respective GUI 126(1)-126(M).

In some examples, the merchant application 124 may also provide point-of-sale (POS) functionality to the merchant device 122 to provide the GUI 126 to enable the merchant 114 to accept payments using the merchant device 122. Alternatively, in some examples, the merchant device 122 may be a fax machine and the merchant 114 may receive the order information 112 via a facsimile transmission from the service computing device 102. As still another example, the merchant device 122 may be a computing device that is configured to receive order information via email, instant messaging, or other electronic communication. As still another example, the merchant device 122 may be a phone, and the merchant device 122 may receive the order information 112 via an SMS text message, voicemail, telephone call, or the like.

In addition, the buyers 110(1)-110(N) may be associated with respective buyer devices 128(1)-128(N) that may execute respective instances of buyer applications 130(1)-130(N). For example, buyers 110 may use buyer devices 128, such as smart phones, tablet computers, wearable computing devices, laptops, desktops, or the like, and these buyer devices 128 may have installed thereon the buyer application 130. The buyer application 130 may enable the buyer 110 to select one or more of the menu items 116 and/or 118 to purchase from one or more of the merchants 114 to be delivered to the buyer 110 by one or more of the couriers 120. For example, the buyer application 130 may present one or more GUIs 132(1)-132(N) on a respective display (not shown in FIG. 1) of the buyer device 130(1)-130(N), respectively, for enabling the buyer 110 to select one or more of the menu items 116 and/or 118 for an order.

Further, the buyer application 130 may enable the buyer 110 to schedule orders from a plurality of the merchants 114 in advance, such as for scheduling menu items for delivery for an upcoming week, upcoming month, or the like. For instance, the buyer 110 may use the GUI 132 for reviewing, managing, and/or confirming scheduled menu items for having the menu items 116 and/or 118 delivered at a specified delivery location in a specified time window on a specified day. The buyer application 130 may further enable the buyer 110 to make a payment for orders using the GUI 132 presented by the buyer application 130. For instance, the service provider 104 may charge a buyer account associated with the buyer 110 for an amount associated with each order.

In some examples, the buyer application 130 and the service computing device 102 may communicate with each other via one or more APIs. Additionally, or alternatively, the buyer application 130 may include a web browser, or the like, and the buyer 110 may navigate to a website associated with the service provider 104. The buyer may use the website associated with the service provider 104 to place an order, manage order scheduling, or the like. Thus, in this case, the website of the service provider may provide at least some of the functionality attributed to buyer application 130 herein.

In addition, the couriers 120(1)-120(L) may be associated with respective courier devices 134(1)-134(L) that may execute respective instances of courier applications 136(1)-136(L). For example, couriers 120(1)-120(L) may use courier devices 134(1)-134(L), respectively, such as smart phones, tablet computers, wearable computing devices, laptops, or the like, and these courier devices 134(1)-134(L) may have installed thereon the courier application 136(1)-136(L), which present GUIs 138(1)-138(L), respectively. The courier application 136 may be configured to receive the delivery information 139 from the service computing device 102 to provide a particular courier 120 with information for picking up a particular order from a merchant's pickup location 119 and for delivering the order to a specified buyer delivery location 121. The courier application 136 may further enable the courier 120 to respond to the service computing device 102 to confirm acceptance of a delivery job and to send a communication when the delivery job is completed.

Additionally, in some cases, the courier application 136 may provide the service computing device 102 with an indication of a current location of a particular courier 120. For instance, one or more GPS receivers or other location sensors (not shown in FIG. 1) associated with each courier device 134 of an active courier may provide location information, and based on this, the courier application 136 may send location information to the service computing device 102, such as by providing an indication of a geographic location of each courier device 134 of each active courier. Thus, a subset of courier devices 134 associated with active couriers may communicate with the service computing device 102, and may send location information obtained from the location sensor associated with each courier device. In some cases, another subset of courier devices associated with inactive couriers may be periodically pinged by the service computing device 102 to determine interest in becoming active and, if so, requesting current location information of the associated inactive courier. Inactive couriers who are interested in being activated may allow their courier devices 134 to respond with their location information, while those who are not interested in being activated may keep their location information private by not responding. In some examples, the courier application 136 and the service computing device 102 may communicate with each other via one or more APIs. Alternatively, in other examples, the courier device 134 may receive the delivery information 139 via an SMS text message, a voicemail, a telephone call, or the like.

The one or more networks 106 may include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 122, the buyer devices 128, and/or the courier devices 134 are able to communicate over the one or more networks 106 using wired or wireless connections, and combinations thereof.

In the illustrated example, the service computing device 102 includes an order processing program 140 that may be executed on the service computing device 102 to provide, at least in part, the order processing functionality attributed to the service computing device 102. The order processing program 140 may receive the order information 108 from the buyers 110 and may associate the order information 108 with a buyer information data structure 142 and a merchant information data structure 144. For instance, based on buyer identifying information that may be included with the order information 108, the order processing program 140 may associate particular order information 108 with a particular buyer account included in the buyer information data structure 142. The order processing program 140 may access the buyer account listed in the buyer information data structure 142 to charge the particular buyer account for the order.

Furthermore, based on a selected merchant 114 identified by the order information 108, the order processing program 140 may associate the order information 108 with a merchant account of a selected merchant identified in the merchant information data structure 144. The order processing program 140 may access the merchant account to determine contact information for sending the order information 112 to the correct merchant device 122 so that the selected merchant 114 can receive and provide confirmation of the order. The order processing program 140 may further access the merchant account of the selected merchant to credit payment to the selected merchant that prepares the order.

In addition, the order processing program 140 may access a courier information data structure 146 to determine courier contact information for sending the delivery information 139 to a selected courier 120 of the plurality of couriers 120(1)-120(L) to determine whether the selected courier 120 is willing to accept the delivery job of delivering the order to the buyer 110. The selected courier 120 may use the GUI 138 presented by the courier application 136 on the courier device 134 to receive a message with information about the order, and to respond with acceptance of the delivery job if the job assignment is accepted. The selected courier 120 may subsequently pick up the order from the selected merchant 114 and deliver the order to the particular buyer 110 at a specified delivery location 121. When the courier 120 has completed delivery of the order to the delivery location 121, the courier 120 may use the GUI 138 presented by the courier application 136 to inform the order processing program 140 that the delivery has been completed. The order processing program 140 may access a courier account identified in the courier information data structure 146 for the particular courier 120 to credit the courier account of the particular courier 120 with payment for the delivery job.

The order processing program 140 may store information associated with each order as past order information in a past order information data structure 148. For instance the past order information data structure 148 may include information about a day of the week, date, and time of day at which each order is received from a respective buyer 110. The past order information structure 148 may further include, for each order, merchant identifying information; buyer identifying information; menu items 116 and/or 118 ordered; the pickup location 119; the delivery location 121; preparation time for the order; location of the courier 120 when the courier accepted the job for delivery of the order; time that the order was picked up by the courier 120; time that the order was delivered to the delivery location 121; amount paid for the order; estimated delivery time provided to the buyer by the service provider; as well as other information, as discussed additionally below.

The order processing program 140 may be further executed by the service computing device 102 to provide a service that enables buyers to automatically schedule and receive meals for selected days of the week. For instance, as discussed additionally below, a buyer 110 may register for the scheduled meals service using GUI 132 presented by the buyer application 130. During registration, the buyer 110 may select various preferences, such as types of meals the buyer would like to receive, may indicate any food allergies, may select the days on which the buyer would like to receive meals, may specify the location at which the buyer would like to receive the meals, may specify the time window during which the buyer would like to receive the meals, and the like. When the buyer 110 has finished selecting the meal preferences, the buyer application 130 may send the meal preferences information 150 to the order processing program 140 on the service computing device 102.

In response to the buyer registering for the scheduled meal service, the order processing program 140 may provide buyer scheduled meal information 152 to the buyer application 130 on the buyer device 128. Receiving the scheduled meal information 152 may at least in part cause the buyer application 130 to present the scheduled meal information 152 in the GUI 132. For instance, the GUI 132 may include information related to the meals that the buyer 110 is scheduled to receive for the upcoming week, the upcoming next several weeks, the upcoming month, or the like. As one example, the GUI 132 may indicate, for each day for which the buyer 110 has elected to receive a meal, the menu item description, the merchant 114 who will prepare the menu item, a specified delivery time window, a delivery location, a number of servings to be delivered, and so forth. In addition, the GUI 132 may enable the buyer 110 to select one or more alternative meals, select a meal kit menu item 118 instead of a prepared menu item 116 in some cases, specify dietary preferences, specify any food allergies, view nutritional information for selected menu items, and the like. Additional details regarding the GUI 132 are discussed below with respect to FIG. 2.

The buyer 110 may have the option to elect not to receive a meal on one or more days. In some cases, the buyer 110 may be able to opt out of receiving a meal within a threshold period of time before the meal is scheduled to be delivered. For instance, a default action of the service may be to provide the top recommended meal for each day for which the buyer 110 is subscribed unless the buyer 110 opts out by the threshold time limit. After the selected menu items 116 and/or 118 are delivered to the specified delivery location during the specified time window, an account of the buyer may be charged, such as via a stored payment instrument (e.g., credit card, bank account, or other payment method).

As mentioned above, the service provider 104 may negotiate with the merchants 114 for wholesale pricing discounts for meals purchased as part of the service. In some cases, the order processing program may send merchant upcoming orders information 158 to the respective merchants at least 24 hours in advance or other threshold time. Further, because the meals are scheduled in advance, e.g., within the threshold time limit, a sufficient number of couriers 120 may be scheduled for delivering the menu items 116 and/or 118 to the buyers 110, and the merchants 114 may have sufficient notice to obtain sufficient ingredients and prepare the menu items 116 and/or 118. For example, couriers 120 may be able to deliver multiple prescheduled menu items 116 and/or 118 from the selected merchants 114 to buyer delivery locations 121 that are within a threshold distance of each other. Thus, the service provider 104 is able to reduce the costs of preparing and delivering the meals to the buyers 110, allowing lower fees to be charged to the buyers 110. In addition, in some cases, a buyer 110 may elect to receive an uncooked meal, i.e., a meal kit menu item 118 rather than a prepared menu item 116. For instance, the meal kit menu items 118 may be prepared by the merchants 114 and delivered to the buyers 110 by the couriers 120, which may provide the buyers 110 with the option of receiving the meal kit menu items 118 and preparing the meal at a later time, if so desired.

Additionally, in some examples, such as when processing a single order from a buyer 110, the order processing program 140 may determine that it would be optimal to substitute a meal kit menu item 118 for a prepared menu item 116 for a particular buyer 110 who is using the buyer application 130 for ordering a meal. For instance, the order processing program 140 may receive, from the buyer application 130 executing on the buyer device 128, an indication that a buyer 110 has accessed the buyer application 130 on the buyer device 128. The buyer application 130 may present the GUI 132 to enable the buyer 110 to order a prepared menu item 116. Further, the buyer application 130 may indicate to the order processing program 140 that the buyer 110 has selected, via the GUI 132, information related to a prepared menu item 116 offered by a selected merchant 114.

In response to the communication from the buyer application regarding the buyer's selection or potential selection of the particular prepared menu item 116, the order processing program 140 may send a communication to the merchant application 124 executing on the merchant computing device 122 associated with the selected merchant 114 to determine a current backlog of orders for the selected merchant 114. Based at least partially on receiving a reply communication from the merchant application 124 indicating that the current backlog of orders for the selected merchant 114 exceeds a threshold, the order processing program 140 may send, to the buyer application 130, item information 160 that causes the buyer application 130 to present, in the GUI 132, information indicating availability of a meal kit menu item 118 corresponding to the prepared menu item 116 that may be offered to the buyer 110 by the selected merchant 114 in place of or as an alternative to the prepared menu item. As one example, the GUI 132 may indicate that the meal kit menu item 118 is currently available for order and that the prepared menu item 116 is available for order with delayed delivery determined based on the amount of the backlog. As another example, the GUI 132 may indicate that the meal kit menu item 118 is available at a reduced price and/or at an earlier delivery time, as compared to the prepared menu item 116, to incentivize the buyer to select the meal kit menu item 118. As still another example, the GUI 132 may indicate that the meal kit menu item 118 is available and the prepared menu item 116 is currently unavailable.

As one example, suppose that the buyer 110 decides to select the meal kit menu item 118, and uses the GUI 132 on the buyer device 128 to make the selection. The order processing program 140 may receive, from the buyer application 130, the buyer selection received via the GUI 132 indicating the order for the meal kit menu item 118. In response, the order processing program 140 may send a communication to the merchant application 124 of the selected merchant 114 to indicate the order received for the meal kit menu item 118 to be provided by the selected merchant 114. Furthermore, the order processing program 140 may send a communication to a courier device 134 associated with a selected courier 120 to instruct the selected courier 120 to pick up the meal kit menu item 118 from the merchant pickup location 119 of the selected merchant 114, and deliver the meal kit menu item 118 to a delivery location 121 indicated by the buyer 110. For example, the merchant 114 may have a number of meal kit menu items 118 already prepared, and the selected courier 120 may be able to pick up the meal kit menu item 118 immediately from the merchant pickup location 119 for delivery to the delivery location 121 specified by the buyer 110.

Figure 2:
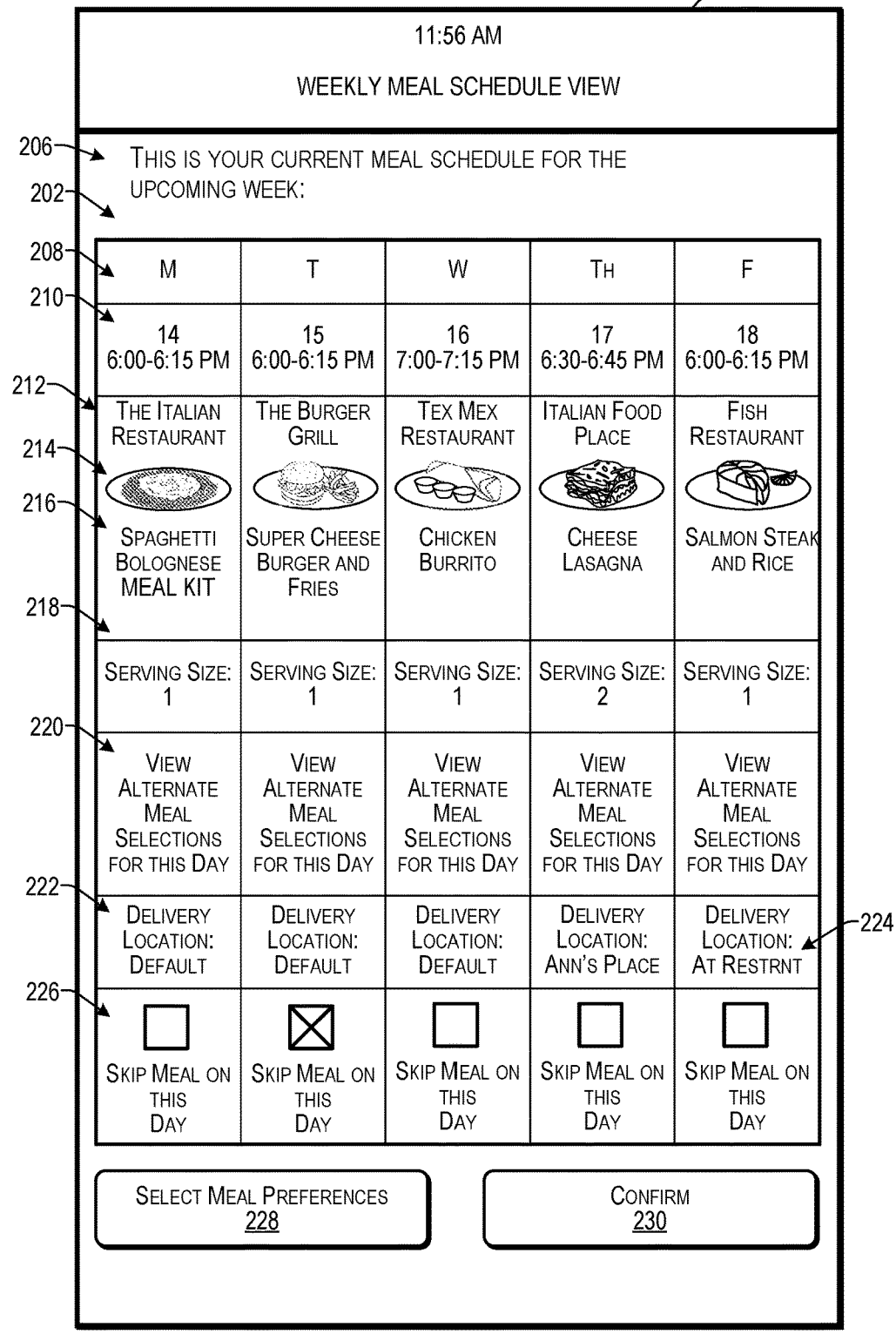
FIG. 2 illustrates an example GUI including a meal schedule that may be presented on a display associated with the buyer device according to some implementations.

FIG. 2 illustrates an example GUI 200 including a meal schedule 202 that may be presented on a display 204 associated with the buyer device 128 according to some implementations. The GUI 200 may correspond to one or more screens of the GUI 132 discussed above with respect to FIG. 1. As indicated at 206, the GUI 200 indicates that the presented information represents the current meal schedule 202 for the buyer for the upcoming week. In this example, suppose that the buyer has selected five days of the week on which to receive a scheduled the meal, and the five days are shown in a weekly-calendar-like format as indicated at 208. In other examples, the buyer may select more or fewer days of the week on which to receive scheduled meals. Furthermore, as indicated at 210, the schedule 202 may include the date and time window on which each respective meal will be delivered to the buyer.

Furthermore, for each selected day, the schedule 202 may include item and merchant information for the meal that is scheduled to be delivered on the particular day. For example, the schedule 202 may indicate the name of the merchant who will provide the meal as indicated at 212, may provide an image of the meal as indicated at 214, and may provide a description of the meal as indicated at 216. Furthermore, in some cases, the buyer may elect to receive a meal kit menu item, rather than a prepared menu item, as indicated by the spaghetti Bolognese meal kit scheduled to be delivered on Monday the $14^{th}$. For example, the default may be to deliver a prepared menu item to the buyer, but the buyer may be able to select an option to receive a meal kit menu item instead of the prepared menu item in some examples.

In addition, the schedule 202 may indicate the serving size of each meal to be delivered, as indicated at 218. For example, suppose that normally the buyer would receive a single serving size, such as for eating alone. However, as indicated on Thursday the $18^{th}$, suppose that the buyer intends to dine with a friend and, accordingly, has changed the serving size to two. For example, the buyer may tap on or otherwise select the indicated serving size 218, and may be presented with a virtual control for changing the serving size 218 to a different number. In addition, as indicated at 220, the buyer may be presented with a virtual control that the buyer may tap on or otherwise select to view alternate menu item selections for a particular day in the schedule 202.

Furthermore, the schedule 202 may include an indication 222 of the delivery location to which the meal will be delivered. For example, the buyer may have a default delivery location such as the buyer's home or other usual delivery location. In addition, the buyer may tap on or otherwise select the indicated delivery location at 222 to be presented with a GUI to enable the buyer to specify a different delivery location.

Additionally, in some examples, rather than having a particular meal delivered to the buyer's delivery location, the buyer may instead elect a different fulfillment option for saving on the delivery fee, such as picking up the meal for takeout or consuming the meal at the merchant's location, i.e., by dining in at the restaurant that is preparing the meal. Accordingly, the buyer may select the indicated delivery location 222, and may be presented with a GUI for selecting one of these other fulfillment options for receiving the menu item, i.e., pick up the menu item for takeout or dining-in at the merchant's location as indicated at 224.

In addition, as indicated at 226, the buyer may select one or more days on which the buyer chooses to not receive a meal. For instance, suppose the buyer has plans on Tuesday after work and has elected to skip receiving the meal on Tuesday the $15^{th}$. Accordingly, the buyer may select the "skip meal" virtual control 226 without penalty as long as the buyer makes the skip meal election within a threshold period of time e.g., more than 24 hours in advance of the scheduled delivery of the meal. As another option, if the buyer elects to skip the meal after the threshold period of time has been passed, the buyer may receive a partial refund for the meal, and the service provider may attempt to sell the meal to a different buyer. Thus, there may be two time thresholds for cancelation, a first threshold before which the buyer is not penalized for cancelation and a second threshold within the first, and before which, if the buyer cancels, the buyer may receive partial credit for the cancelation. Alternatively, rather than canceling the meal, the buyer may access the delivery location 222 for the selected day and change the delivery address for the selected meal to another delivery address within the service region, such as for giving the meal to another person, such as a friend of the buyer, who may receive delivery of the meal.

As still another alternative, the order processing program may execute a machine learning model, a predictive algorithm, or other computational model for determining an expected percentage of buyers who will cancel their meals on any given day. The order processing program may decrease the number of meals to be preordered from the merchant on a given day based on the cancelation prediction determined by the computational model. Additional details of the computational models that may be applied in some examples herein are discussed below with respect to FIG. 8.

In the GUI 200, a virtual control 228 may be included. The buyer may tap on, or otherwise select the virtual control 228 to be presented with additional GUI screens for selecting meal preferences, such a types of meals preferred by the buyer, types of meals the buyer does not want, days on which the buyer would like to receive meals, and so forth. Further, the GUI 200 includes a virtual control 230 that the buyer may tap or otherwise select to confirm the current schedule 202.

Figure 3:
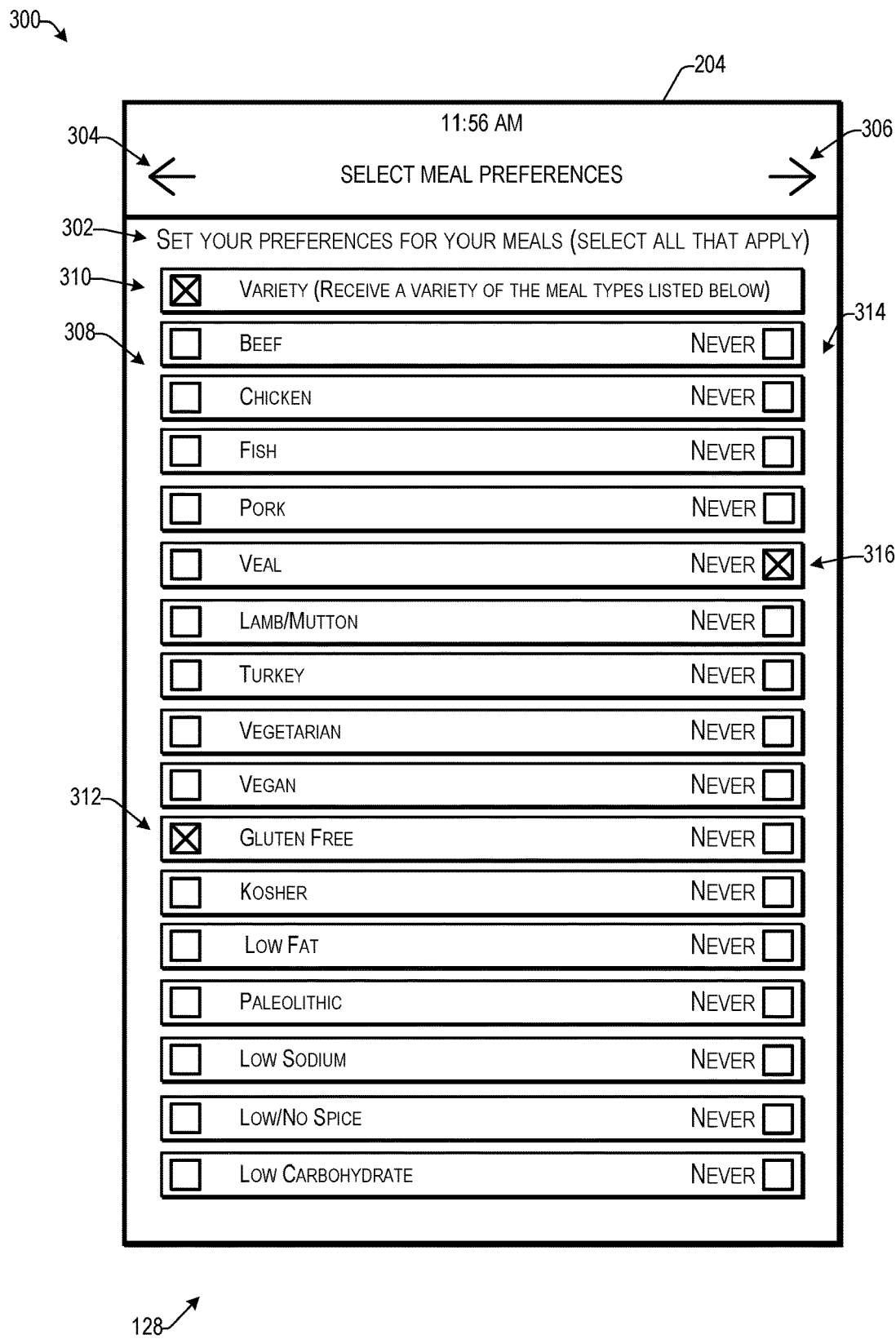
FIG. 3 illustrates an example GUI for enabling a buyer to select meal preferences according to some implementations.

FIG. 3 illustrates an example GUI 300 for enabling a buyer to select meal preferences for menu items according to some implementations. The GUI 300 may correspond to one or more screens of the GUI 132 discussed above with respect to FIG. 1. In this example, suppose that the buyer has selected the virtual control 228 in the GUI 200 of FIG. 2 discussed above for selecting meal preferences, and has been presented with the GUI 300 which indicates at 302 that the buyer may use the GUI 300 for selecting menu item preferences for scheduled meals.

The GUI 300 includes a back arrow 302 that the buyer may select to return to a previous menu, and a forward arrow 304 that the buyer may select to advance to an additional menu for selecting meal preferences. As illustrated, the GUI 300 includes a plurality of selectable meal preferences 308 for selecting various types of menu items that a buyer may prefer. For instance, the buyer may select to receive a variety of menu items, as indicated at 310. Alternatively, the buyer may select individual menu item types, which may include one or more types of protein that the buyer would prefer to receive, such as beef, chicken, fish, pork, veal, lamb/mutton, turkey, vegetarian, or vegan. In addition, the buyer may indicated a preference for various other meal types such as gluten-free, kosher, low-fat, Paleolithic, low sodium, low/no spice, and low carbohydrate.

In the illustrated example, suppose that the buyer has selected gluten-free, as indicated at 312. Accordingly, based on this selection by the buyer, the order processing program might only schedule gluten-free meals for the buyer to receive from the scheduled meal service. In addition, as indicated at 314, the buyer may be provided with the ability to indicate types of meals that the buyer never wants to receive. For instance, as indicated at 316, suppose that the buyer has indicated that the buyer would never like to receive any meals that include veal as a component. When the buyer has finished selecting meal preferences in the GUI 300, the buyer may select the back arrow 304 to return to the previous GUI or may select the forward arrow 306 to select additional meal preferences.

Figure 4:
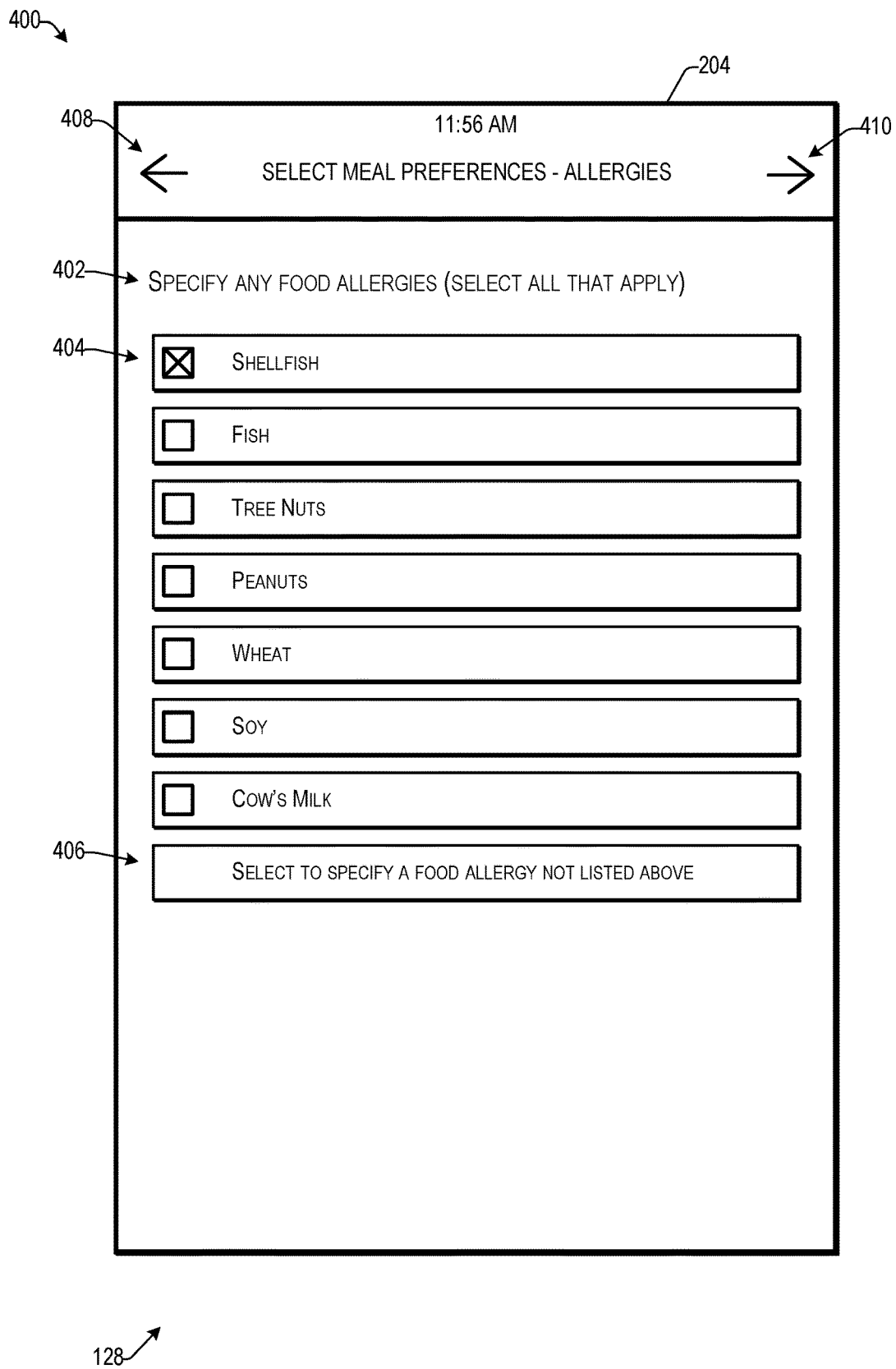
FIG. 4 illustrates an example GUI that may be used by the buyer to select meal preferences according to some implementations.

FIG. 4 illustrates an example GUI 400 that may be used by the buyer to select meal preferences according to some implementations. The GUI 400 may correspond to one or more screens of the GUI 132 discussed above with respect to FIG. 1. In this example, as indicated at 402, the buyer may specify any food allergies that the buyer has. For instance, the GUI 400 includes a listing of common food allergies such as shellfish, fish, tree nuts, peanuts, wheat, soy, and cow's milk. In this example, suppose that the buyer has selected shellfish as an allergy, as indicated at 404. Furthermore, if the buyer should have an allergy that is not listed in the GUI 400, the GUI 400 includes a virtual control 406 that the buyer may tap on or otherwise select to specify an allergy that is not included in the list provided in the GUI 400.

When the buyer has finished selecting meal preferences, the buyer may select a back arrow 408 to return to a previous GUI or may select a forward arrow 410 to continue to one or more additional preference GUIs. For example, additional preference GUIs may include a GUI for selecting days of the week for receiving meals, a GUI for specifying a default delivery address, alternate delivery addresses, and so forth (not shown in FIG. 4).

Figure 5:
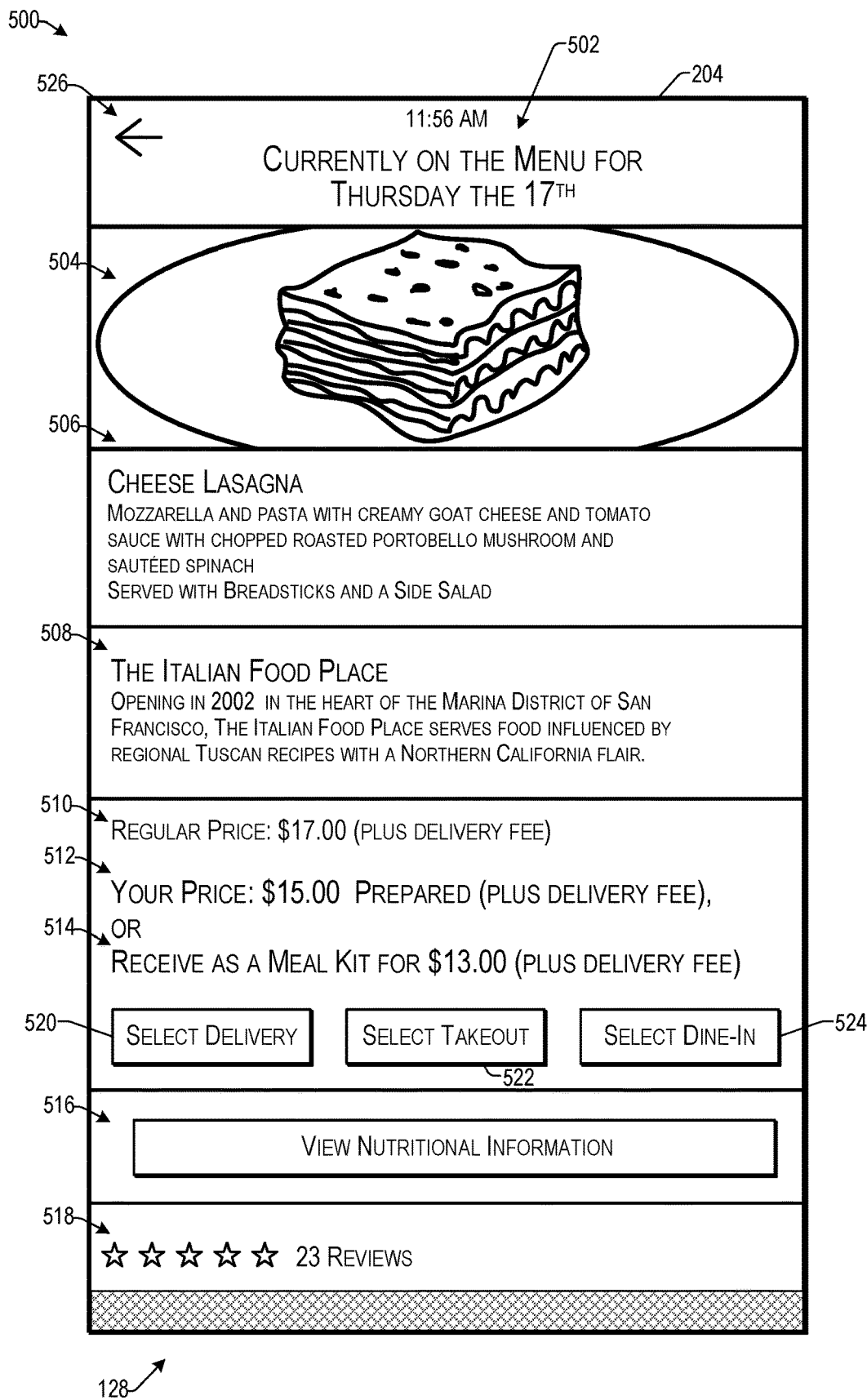
FIG. 5 illustrates an example that enables the buyer to view details about a selected menu item according to some implementations.

FIG. 5 illustrates an example GUI 500 that enables the buyer to view details about a selected menu item according to some implementations. The GUI 500 may correspond to one or more screens of the GUI 132 discussed above with respect to FIG. 1. In this example, suppose that the buyer has selected the merchant 212, image 214, or the description 216 of the meal offered for Thursday the 17$^{th}$ in the schedule 202 of FIG. 2. In response, the buyer application may present the GUI 500 including a detailed description of the menu item currently on the schedule for Thursday the 17$^{th}$, as indicated at 502, to provide the buyer with more information about the selected menu item. In this example, the GUI 500 includes an image 504 of the menu item, a description 506 of the menu item, and a description 508 of the merchant who will prepare the menu item.

In addition, in this example, the GUI 500 includes an indication 510 of the regular price for the menu item, an indication 512 of the price that the buyer will pay to receive the menu item as part of the scheduled meal service, and an indication 514 that the menu item is available as a meal kit for a reduced price. Furthermore, in other examples, rather than being charged for the individual price for the scheduled meals, the buyer may pay a weekly or monthly predetermined or fixed fee for receiving the meals, or may pay through various other pricing schemes, as will be apparent to those of skill in the art having the benefit of the disclosure herein.

In addition, the GUI 500 includes a selectable virtual control 516 that the buyer may tap on or otherwise select to view nutritional information about the meal. Furthermore, the GUI 500 may include buyer ratings and/or buyer reviews 518 of the meal and/or of the merchant who is preparing the meal. After the buyer has received the scheduled menu item, the buyer may be able to use the GUI provided by the buyer application to post a review of the menu item, the merchant, and/or the delivery service.

Additionally, the GUI 500 provides the buyer with the option to receive the menu item for delivery, as indicated at 520, in which case a delivery fee may be charged to the buyer. In some examples, delivery may be the default fulfillment option for providing the scheduled meals herein if no other fulfillment selection is made. Alternatively, the buyer may elect to travel to the merchant's location to pick up the menu item for a takeout fulfillment option, as indicated at 522, or may dine-in at the merchant's location, as indicated at 524, as another alternative fulfillment option. If the buyer decides to select picking up the menu item for takeout as indicated at 522, the buyer may be provided with the option of either taking out a prepared menu item or a meal kit menu item. On the other hand, typically, a meal kit might not be able to be prepared at a merchant location. Accordingly, if the buyer selects the dine-in fulfillment option 524, the buyer's choice may be limited to receiving the prepared menu item, as indicated at 512. Alternatively, there may be some instances in which a meal kit menu item can be prepared at the merchant location, in which case the meal kit option 514 may also be available upon the buyer selecting the dine-in fulfillment option 524.

Furthermore, when the buyer selects the takeout fulfillment option 522 or the dine-in fulfillment option 524, the order processing program may receive a communication from the buyer application indicating that the buyer has selected takeout fulfilment 522 or dine-in fulfillment 524, respectively. In response, the order processing program may send a communication to the merchant application on the merchant computing device of the selected merchant (i.e., the Italian Food Place in this example) to inform the merchant application that the buyer will be picking up the menu item or dining-in at the merchant's location. Additionally, in some examples, when the buyer selects the dine-in fulfilment option 524, this communication may cause the merchant application to reserve a table at the merchant location for the buyer so that the reserved table is available when the buyer arrives, e.g., during a specified time window, to dine-in at the merchant location. When the buyer has finished viewing the meal information and making any desired changes, the buyer may select a back button 526 or the like to return to the GUI 200 of FIG. 2.

Figure 6:
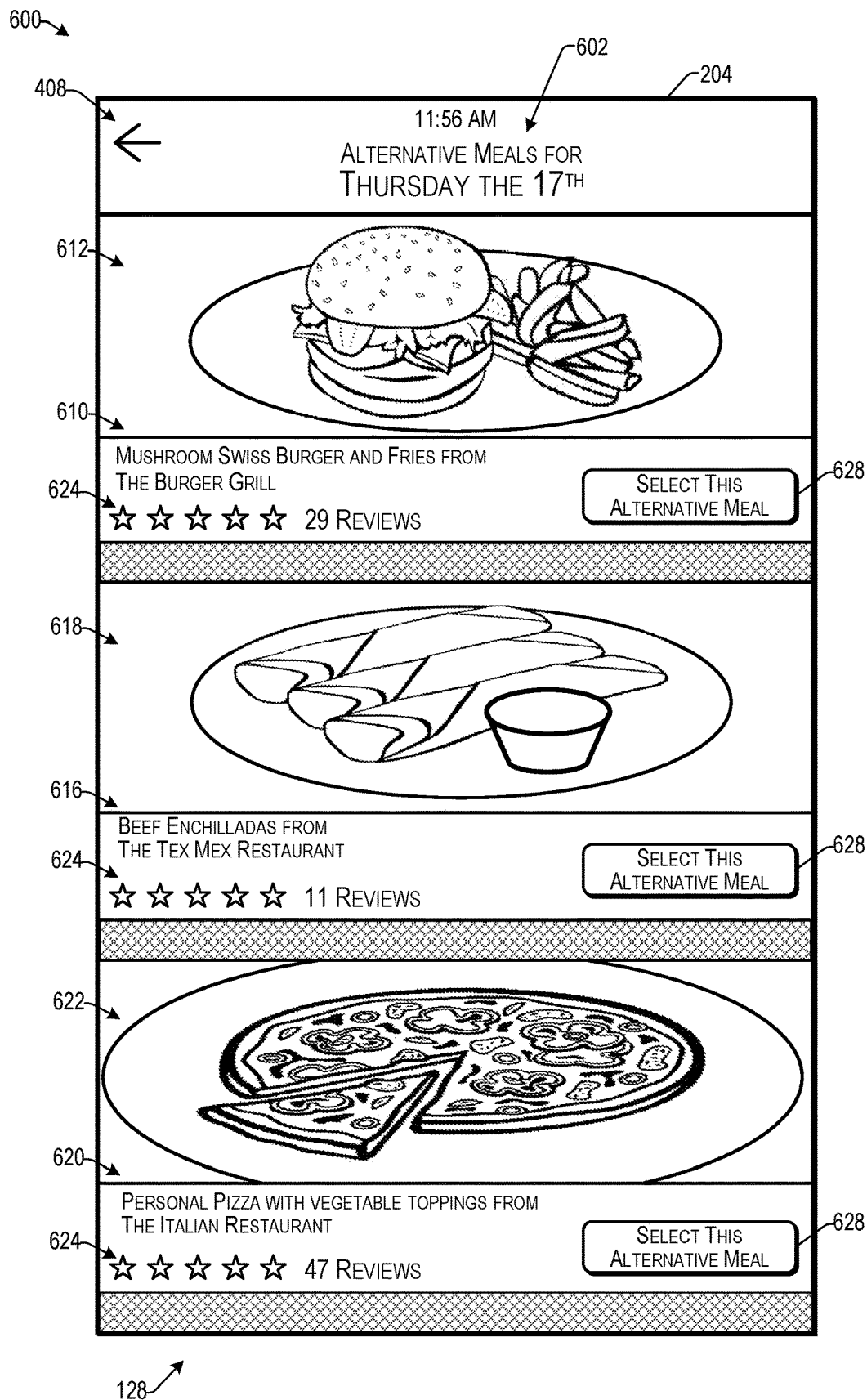
FIG. 6 illustrates an example GUI that enables the buyer to select an alternative menu item for a selected day of the week according to some implementations.

FIG. 6 illustrates an example GUI 600 that enables the buyer to select an alternative menu item for a selected day of the week, as indicated at 602, according to some implementations. The GUI 600 may correspond to one or more screens of the GUI 132 discussed above with respect to FIG. 1. In the illustrated example, the GUI 600 presents merchant information about menu items available from three different merchants, including a description 610 and a representative image 612 of a first menu item available from a first merchant, "The Burger Grill"; a description 616 and a representative image 618 of a second menu item available from a second merchant, "The Tex-Mex Restaurant"; and a description 620 and a representative image 622 of a third menu item available from a third merchant, "The Italian Restaurant". In addition, ratings and/or buyer reviews may be available for each of the presented menu items as indicated at 624. Further, while information about three merchants and available menu items are presented in this example, information about other merchants and menu items that may be offered for the selected day may be presented in the GUI 600 by the buyer scrolling or otherwise traversing through the merchant information presented in the GUI 600.

The buyer may tap on or otherwise select one of the presented menu items to determine more information about the presented menu item. For example, the buyer may be presented with a GUI similar to the GUI 500 discussed above with respect to FIG. 5 that provides detailed information about the menu item, the merchant who is offering the menu item, the nutritional information about the menu item, the price for the menu item, whether the menu item is also offered as a meal kit, and so forth. If the buyer decides to select one of the menu items presented in the GUI 600, the buyer may tap on or otherwise select a virtual control 628 adjacent to the description of the desired menu item to indicate that the buyer desires to select this alternative meal. Upon making the selection, the buyer application may present an updated version of the GUI 200 of FIG. 2. For example, the buyer application may update the GUI 200 of FIG. 2 to include the menu item description and other information about the selected menu item in place of the menu item that was previously presented for the selected day in the GUI 200. Alternatively, in other examples, the order processing program may send updated GUI information to the buyer application based on the buyer's selection.

Figure 7:
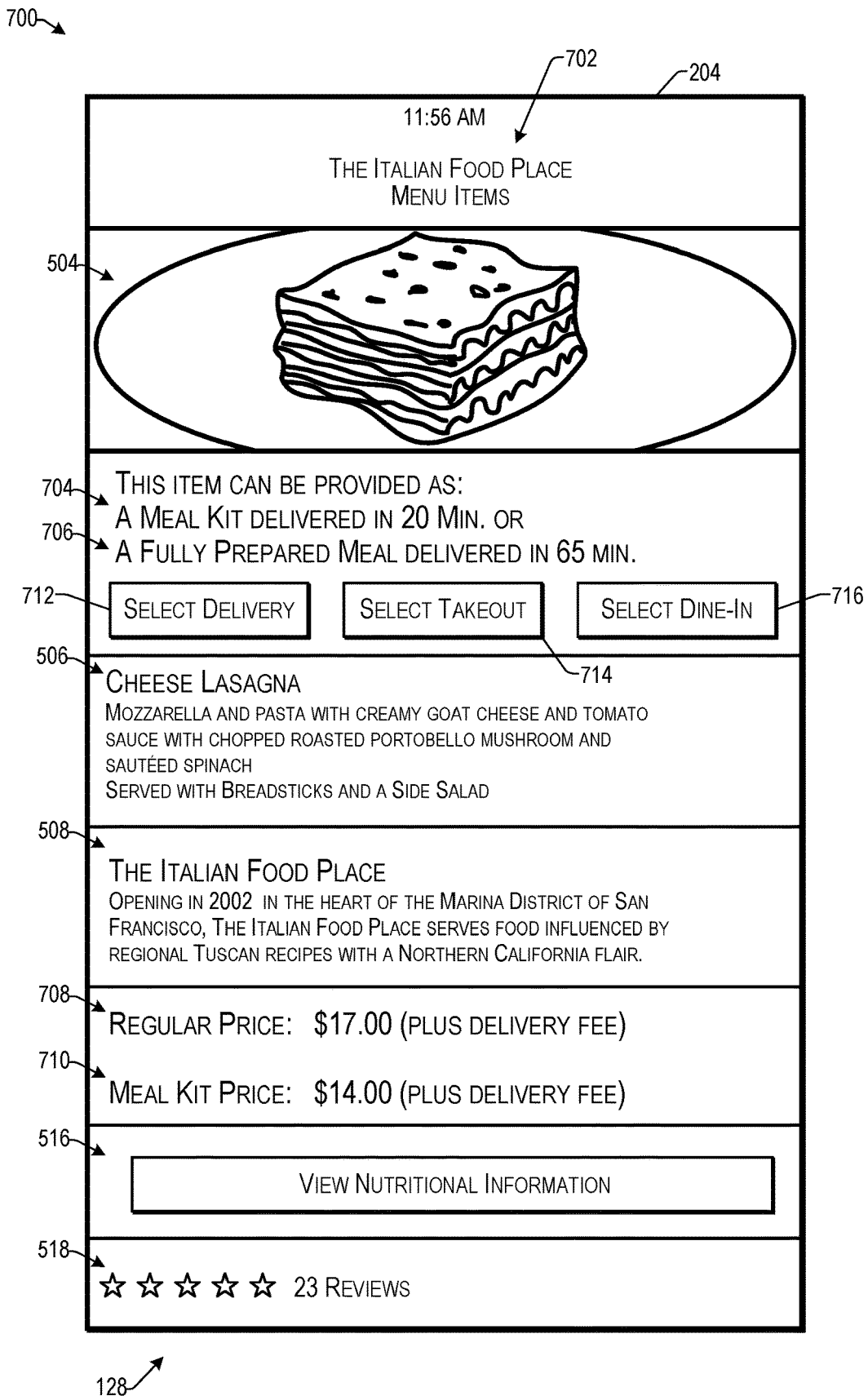
FIG. 7 illustrates an example GUI that may be presented on the display according to some implementations.

FIG. 7 illustrates an example GUI 700 that may be presented on the display 204 according to some implementations. The GUI 700 may correspond to one or more screens of the GUI 132 discussed above with respect to FIG. 1. In this example, suppose that a buyer desires to order some food and has opened the buyer application on the buyer device 128. The buyer may initially browse through the available merchants and menu items. In this example, suppose that the buyer has browsed to the cheese lasagna menu item offered by the merchant named "The Italian Food Place", as indicated at 702. The buyer application may present the GUI 700, which is similar to the GUI 500 discussed above with respect to FIG. 5. Accordingly, the GUI 700 includes the menu item image 504, the menu item description 506, the merchant description 508, the virtual control 516 for viewing nutritional information, and the buyer ratings and reviews 518.

In some examples, when the buyer accesses the menu items of the particular merchant, the buyer application may send a communication to the order processing program on the service computing device indicating that the buyer is interested in ordering from the Italian Food Place. Accordingly, the order processing program may receive, from the buyer application executing on the buyer device 128, the communication indicating that the buyer has accessed item information related to menu items offered by The Italian Food Place. In response to the communication from the buyer application, the order processing program may send a communication to the merchant application executing on the merchant computing device associated with the selected merchant (i.e., The Italian Food Place) to determine a current backlog of orders for the selected merchant. Based at least partially on receiving a reply communication from the merchant application indicating that the current backlog of orders for the selected merchant exceeds a threshold number of orders (and/or a threshold total preparation time for the current backlog), the order processing program may send, to the buyer application, a reply communication including item information that causes the buyer application to present, in the GUI 700, information indicating availability of a meal kit menu item as well as information for the prepared menu item.

In the illustrated example, in response to receiving the item information from the service computing device, the GUI 700 presents an indication that a meal kit may be delivered in 20 minutes, as indicated at 706, or that the prepared meal may be delivered in 65 minutes, as indicated at 710. Accordingly, in this example, the GUI 700 may indicate that the meal kit version of the menu item is currently available for delivery and that the prepared version of the menu item is available for order with delayed delivery determined based on the amount of the backlog. For example, if the merchant will not be able to begin preparing the menu item for 20 minutes due to the current backlog, the order processing program may add the preparation time (e.g., determined from merchant information included in the merchant information data structure discussed above) for the meal plus the backlog time, plus an estimated delivery time (e.g., determined based on distance from the merchant pickup location to the buyer delivery location along with current traffic conditions) to determine the amount of time in which the fully prepared meal may be delivered to the buyer.

Additionally, as indicated at 708 and 710, the GUI 700 may indicate that the meal kit menu item is available at a reduced price 710, as compared to the price 708 of the prepared menu item, to further incentivize the buyer to select the meal kit menu item. As still another example (not shown in FIG. 7), if the backlog at the merchant is extreme (e.g., exceeds a second threshold amount of orders and/or total preparation time for the backlog), the GUI 700 may indicate that only the meal kit menu item 704 is available and the prepared menu item 706 is currently unavailable.

When the buyer receives a meal kit menu item, the meal kit may come with instructions for preparing the meal so that the buyer may be satisfied with the outcome of the meal preparation. Additionally, or alternatively, the buyer may access the instructions for preparing the meal kit through the GUI provided by the buyer application on the buyer device. Furthermore, in some examples, the buyer may be able to post one or more suggestions, comments, or the like, in the buyer application for assisting others in preparing the meal kit based on the buyer's experience that may be viewed by other buyers who are preparing the same meal kit.

Additionally, the GUI 700 provides the buyer with the fulfilment option to receive the menu item for delivery, as indicated at 712, in which case a delivery fee may be charged to the buyer. Alternatively, the buyer may elect to pick up the menu item for takeout, as indicated at 714, or may go to the merchant's location and dine-in at the restaurant, as indicated at 716. If the buyer decides to select the menu item for takeout, as indicated at 712, the buyer may be provided with the option of either taking out the prepared menu item 706 or the meal kit menu item 704. On the other hand, typically, a meal kit may not be prepared at most merchant locations. Accordingly, if the buyer selects the dine-in fulfilment option 716, the buyer's choice may be limited to the prepared meal option 706. Alternatively, there may be some instances in which a meal kit can be prepared at the merchant location, in which case the meal kit option 704 may also be available upon the buyer selecting the dine-in fulfilment option 716.

Furthermore, when the buyer selects the takeout fulfilment option 714 or the dine-in fulfilment option 716, the order processing program may receive a communication from the buyer application indicating that the buyer has selected takeout fulfilment 714 or dine-in fulfilment 716. In response, the order processing program may send a communication to the merchant computing device of the selected merchant (i.e., the Italian Food Place in this example) to inform the merchant that the buyer will be picking up the menu item or dining in at the merchant's location.

Additionally, in some examples, when the buyer selects the dine-in option 716, this may cause the merchant application to reserve a table at the merchant's location for the buyer so that the reserved table is available when the buyer arrives to dine-in at the merchant location. In the situation in which the merchant has a backlog, the reservation for the table may be set at a time according to the merchant's backlog and or otherwise based on availability of the tables at the merchant's location. For example, the merchant application may send a communication to the order processing program to indicate when the buyer should arrive at the merchant location for the dine-in fulfilment option. Upon receiving an indication of a time for menu item pickup or dine-in, the buyer may determine whether to accept the time offered by the merchant or to instead receive the menu item for delivery.

In some examples, to place an order, the buyer may select the name or the representation of one or more of the menu items, such as by tapping on the price for the prepared menu item or the meal kit menu item. The buyer may then subsequently be presented with a pop-up window, a separate GUI, or the like (not shown in FIG. 7), asking the buyer to select or confirm a delivery time (or pickup time or dine-in time) and the price for the selected menu item. In response to the receipt of the confirmation via the GUI, the buyer application may send the order information to the order processing program, which in turn may send the order information to the merchant application on the merchant device. Furthermore, in the case of delivery, the order processing program may send a communication to a courier device to instruct the courier to pick up the menu item from the merchant and deliver the menu item to the buyer's delivery location.

Figure 8:
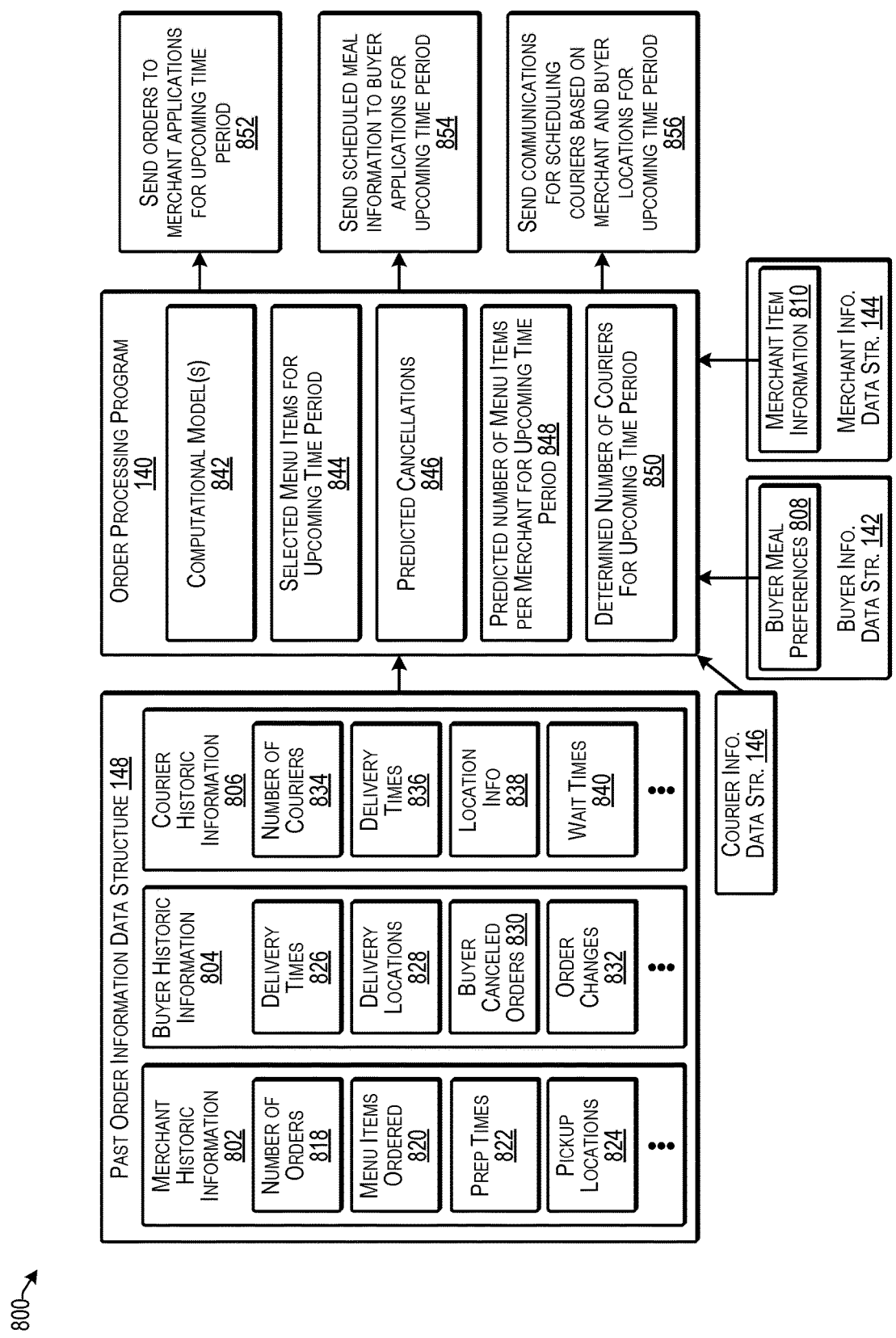
FIG. 8 is a conceptual block diagram illustrating an example of determining orders for merchants, determining meals for buyers, and scheduling couriers according to some implementations.

FIG. 8 is a conceptual block diagram 800 illustrating an example of determining orders for merchants, determining menu items for buyers, and scheduling couriers according to some implementations. In this example, the order processing program 140 may receive the past order information from the past order information data structure 148 including merchant historic information 802, buyer historic information 804, and courier historic information 806. In addition, the order processing program 140 may receive buyer information from the buyer information data structure 142, such as buyer meal preferences 808. Further, the order processing program 140 may receive merchant information from the merchant information data structure 144, such as merchant item information including menu item preparation times, menu item spoilage times, menu item prices, menu item nutritional information, and so forth. Additionally, the order processing program 140 may receive courier information from the courier information data structure 146, such as courier locations, courier schedules, and the like. Further, while several types of information that may be used by the order processing program 140 are illustrated, in other examples, other or additional types of information may be used by the order processing program 140, as discussed above, and/or as will be apparent to those of skill in the art having the benefit of the disclosure herein.

The merchant historic information 802 includes historic order information related to the merchants, e.g., various types of information related to past orders filled by the merchants that participate in the service of the service provider 104. For instance, the merchant historic information 802 may include a number of orders 818 received in the past by each merchant at particular times on particular days of the week, particular dates, and the like, such as when participating in scheduled meals and non-scheduled meals. Further, the merchant historic information 802 may include the menu items ordered 820 from each merchant for each order, the preparation time 822 for each order, e.g., including an indication of whether the merchant was operating at or near maximum capacity, and the pickup location 824 for each order.

Additionally, the buyer historic information 804 may include historic order information related to the buyers. Examples of buyer historic information 804 may include order delivery times 826, e.g., a time of day, day of the week, and date on which the buyer requested scheduled orders to be delivered, delivery locations 828 to which each order was delivered, and whether the buyer canceled any scheduled orders 830. The buyer historic information 804 may further include order changes, such as whether the buyer switched from a default menu item to one of the alternative menu items offered on that day.

Further, the courier historic information 806 includes historic order information related to the couriers. For example, the courier historic information 806 may include a number of couriers 834 that were active at any given time in the past. Further, the courier historic information 806 may include delivery times 836, which may indicate when an order was delivered and how long it took each courier to deliver each order after picking up the order from the merchant's pickup location. Additionally, location information 838 may include locations of individual couriers when the order information is provided to the couriers, such as for determining how far each courier was from the pickup location when the courier was provided with the information for picking up and delivering an order. The location information 838 may further indicate how far each courier had to travel after picking up each order to make delivery of the order. In addition, the courier historic information 806 may include wait times 840, which may indicate how long each courier had to wait after delivering an order before being assigned to and/or picking up another order. Furthermore, the merchant historic information 802, the buyer historic information 804, and the courier historic information 806 may include additional types of information, with the foregoing being merely several examples of the types of information that may be employed by the order processing program 140.

In some implementations, the order processing program 140 may employ one or more computational models 842 for determining the selected menu items 844 for an upcoming time period 844. For example, the computational model 842 may be executed or otherwise used to determine which menu items offered by the merchants are menu items that a large threshold number of buyers would be interested in having included in their scheduled meals for a particular upcoming day of an upcoming week. For example, the computational model 842 may be trained to take into account the buyer meal preferences 808 of buyers that will be receiving meals for the upcoming time period. For example, the computational model may determine a number of common preferences among a largest number of the buyers, and may match these preferences with the merchant item information 810 for determining optimal menu items to use as the primary or default meals recommended for a subset of the buyers.

As one example, the computational model may compare the buyer preferences of the buyers of the plurality of buyers with the buyer preferences of other buyers of the plurality of buyers to determine a threshold number of the buyers having buyer preferences in common. The computing device may further compare the common buyer preferences with the item information about the plurality of menu items offered by the merchants (e.g., based on ingredients, nutritional information, item descriptions, and the like). Additionally, in some examples, the determined threshold number of buyers is a largest first subset of the plurality of buyers, and the computing device may further compare the buyer preferences of the remaining buyers not included in the first subset with each other to determine a next largest second subset of buyers having buyer preferences in common. The computing device may then compare the common buyer preferences of the second subset with the item information about the menu items to determine at least one additional selected menu item from among the plurality of menu items. The computing device may continue this process until at least one menu item is matched for each buyer for the upcoming time periods (e.g., the upcoming week, or the like).

Accordingly, for the other buyers whose preferences do not match those of the first subset, the computational model may determine other merchant menu items that match those particular buyers while trying to maximize the number of matching buyers and minimize the number of different merchants/items for each day of the week. For example, depending on the number of buyers participating in the scheduled meal service it may be desirable to only have one or two primary menu items and/or merchants per day and no more than five to ten alternate menu items and/or merchants per day. This arrangement enables the service provider to take advantage of the economies of scale and enable the service provider to negotiate better pricing on behalf of the buyers who participate in the scheduled meal service.

Furthermore, in some examples the computational model 842 may further be executed to determine the predicted cancellations per day 846. For example, the computational model may examine buyer cancel orders 830 and other information in the past order information data structure to determine a prediction of the number of orders that will be canceled on any particular day of the upcoming week, month, or the like. Accordingly, based on a confidence level of the prediction, the computational model may submit a number of orders to the respective merchants that is less than the number of buyers who are actually participating in the scheduled meal service, thereby avoiding the situation in which the buyers cancel meals and the service provider is responsible for selling the canceled meals to other customers.

Based on determining the selected menu items 844 for the upcoming time period and the predicted cancellations 846, the order processing program 140 may determine the predicted number of menu items 844 per merchant for the upcoming time period. In addition, based on the delivery locations of the buyers and the respective pickup locations of the merchants, the order processing program 140 may determine a number of couriers 850 required for delivering the scheduled meals on any particular day of the upcoming time.

Based on the information determined by the order processing program 140 using the computational model(s) 842, the order processing program may send orders for menu items to merchant applications of the respective merchants who are requested to prepare the menu items for the upcoming time period, as indicated at 852. In addition, the order processing program 140 may send scheduled meal information to the buyer applications of the participating buyers for the upcoming time period, as indicated at 854. Furthermore, the order processing program 140 may send communications for scheduling couriers based on the merchant pick locations and the buyer delivery locations for the upcoming time period, as indicated at 856.

As one example, the computational model(s) 842 may include a trained machine learning model that accounts for numerous pieces of information included in the past order information 148, as well as the current information in the buyer information data structure 142, the merchant information data structure 144, and the courier information data structure 146. In some cases, the machine learning model may be initially trained using a set of training data, such as from the past order information data structure 148, checked for accuracy, and then used for predicting or otherwise determining the information discussed above, such as based on a confidence score exceeding a specified threshold of confidence. The machine learning model may be periodically updated and re-trained based on new training data to keep the model up to date and accurate. Examples of suitable statistical and/or other machine learning models that may be incorporated into the computational model(s) 842 herein may include regression models, such as linear and nonlinear regression models, and stochastic models, such as Markov models, hidden Markov models, as well as neural networks, support vector machines, and various other types of machine learning techniques, algorithms, and the like. Additionally, or alternatively, the computational model(s) 842 herein may include numerous other algorithms, decision-making rules, computational logic, and the like, that may additionally or alternatively be used for determining the information described herein.

In some cases, the order processing program 140 may receive courier location information from each courier device associated with a courier that is currently active in the courier network. For instance, an active courier may include a courier who is currently on duty or who has otherwise indicated a willingness to have delivery jobs assigned to him or her when new orders are received from buyers. An inactive courier may include a courier who is currently off duty or who has otherwise not indicated that delivery jobs should be assigned to him or her. As delivery jobs are received, the delivery jobs may be assigned to active couriers using various different techniques. For example, couriers may be assigned delivery jobs in a round robin fashion, such that a courier who has gone the longest without receiving a job is offered or assigned the next delivery job received. Various other factors may also be taken into consideration when assigning delivery jobs, such as distance of each courier from a pickup location, whether a particular courier has been posted at the pickup location, is waiting at a nearby location, or the like. As one example, delivery jobs may be assigned using a round robin technique among a subset of couriers who are within a threshold distance of the pickup location of a particular job that is to be assigned.

In addition, based on the past order information 148 and the various other conditions such as current traffic and weather, the order processing program 140 may predict in real time how many couriers are needed for upcoming time periods, such as for delivering scheduled meals, as well as delivering orders received. As a result, the order processing program 140 may determine a number of couriers that should be activated or deactivated for each of the upcoming time periods.

Figure 9:
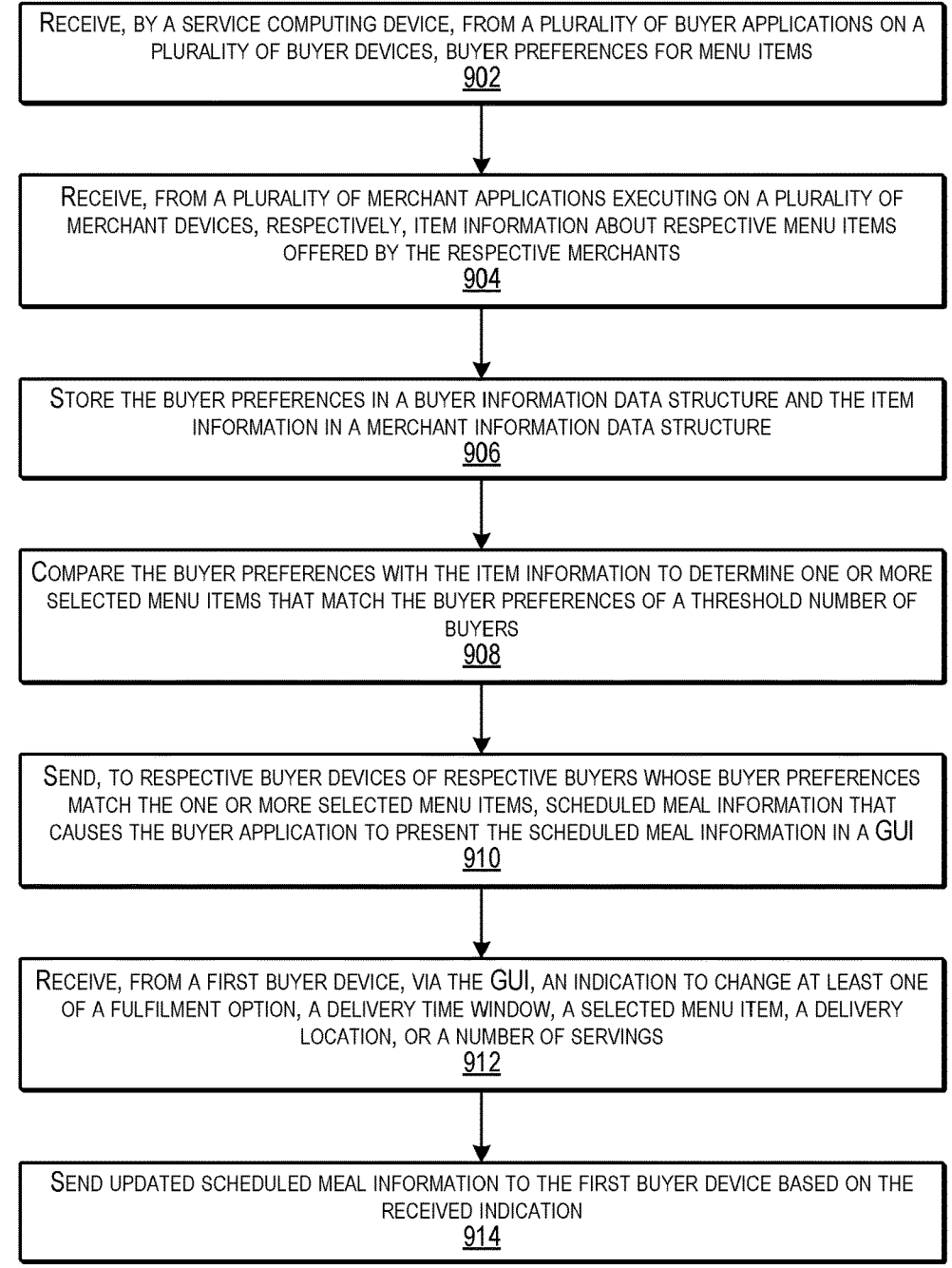
FIG. 9 is a flow diagram illustrating an example process according to some implementations.
Figure 10:
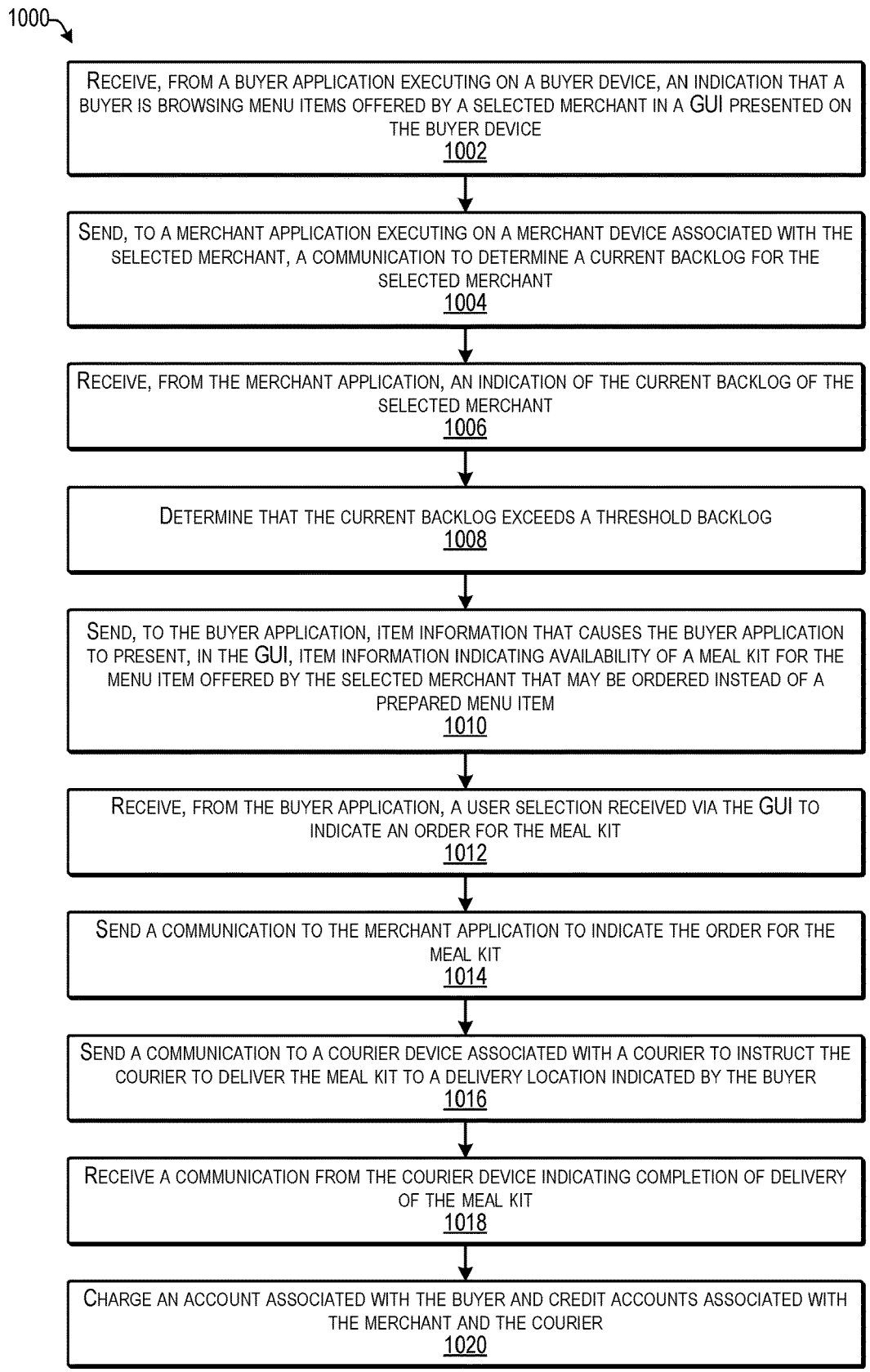
FIG. 10 is a flow diagram illustrating an example process according to some implementations.

FIGS. 9 and 10 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 9 is a flow diagram illustrating an example process 900 according to some implementations. In some examples, the process may be executed by the service computing device 102 or other suitable computing device.

At 902, the computing device may receive, from a plurality of buyer applications on a plurality of buyer devices, buyer preferences for menu items. For instance, a buyer may use the GUIs discussed above to enter the buyer preferences for receiving scheduled meals for the scheduled meal service herein.

At 904, the computing device may receive, from a plurality of merchant applications executing on a plurality of merchant devices, respectively, item information about respective menu items offered by the respective merchants.

At 906, the computing device may store the buyer preferences in a buyer information data structure and store the item information in a merchant information data structure.

At 908, the computing device may compare the buyer preferences with the item information to determine one or more selected menu items that match the buyer preferences of a threshold number of buyers. For example, the computing device may compare the buyer preferences of the buyers of the plurality of buyers with the buyer preferences of other buyers of the plurality of buyers to determine the threshold number of the buyers having buyer preferences in common. The computing device may further compare the common buyer preferences with the item information about the selected menu item(s) to determine at least the selected menu item(s) from among the plurality of menu items. Additionally, in some examples, the determined threshold number of buyers is a largest first subset of the plurality of buyers, and the computing device may further compare the buyer preferences of the remaining buyers not included in the first subset with each other to determine a next largest second subset of buyers having buyer preferences in common. The computing device may then compare the common buyer preferences of the second subset with the item information about the menu items to determine at least one additional selected menu item from among the plurality of menu items.

At 910, the computing device may send, to respective buyer devices of respective buyers whose buyer preferences match the one or more selected menu items, scheduled meal information that causes the buyer application to present the scheduled meal information in a GUI. For example, the buyer application may present the GUI 200 discussed above with respect to FIG. 2.

At 912, the computing device may receive, from a first buyer device, via the GUI, an indication to change at least one of a fulfilment option, a delivery time window, a selected menu item, a delivery location, or a number of servings.

At 914, the computing device may send updated scheduled meal information to the first buyer device based on the received indication of the change.

FIG. 10 is a flow diagram illustrating an example process 1000 according to some implementations. In some examples, the process may be executed by the service computing device 102 or by another suitable computing device.

At 1002, the computing device may receive, from a buyer application executing on a buyer device, an indication that a buyer is browsing menu items offered by a selected merchant in a GUI presented on the buyer device.

At 1004, the computing device may send, to a merchant application executing on a merchant device associated with the selected merchant, a communication to determine a current backlog for the selected merchant.

At 1006, the computing device may receive, from the merchant application, an indication of the current backlog of the selected merchant.

At 1008, the computing device may determine that the current backlog exceeds a threshold backlog. For example, determining that the current backlog exceeds the threshold may be based on at least one of: a total number of orders being processed by the selected merchant; a total estimated preparation time for the orders being processed by the selected merchant; or a predicted preparation start time received from the merchant for the menu item.

At 1010, the computing device may send, to the buyer application, item information that causes the buyer application to present, in the GUI, item information indicating availability of a meal kit for the menu item offered by the selected merchant that may be ordered instead of a prepared menu item. As one example, the user interface indicates that the meal kit is currently available for order and that the prepared menu item is available for order with delayed delivery based on the backlog.

At 1012, the computing device may receive, from the buyer application, a user selection received via the GUI to indicate an order for the meal kit.

At 1014, the computing device may send a communication to the merchant application to indicate the order for the meal kit.

At 1016, the computing device may send a communication to a courier device associated with a courier to instruct the courier to deliver the meal kit to a delivery location indicated by the buyer.

At 1018, the computing device may receive a communication from the courier device indicating completion of delivery of the meal kit.

At 1020, the computing device may charge an account associated with the buyer and credit accounts associated with the merchant and the courier.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
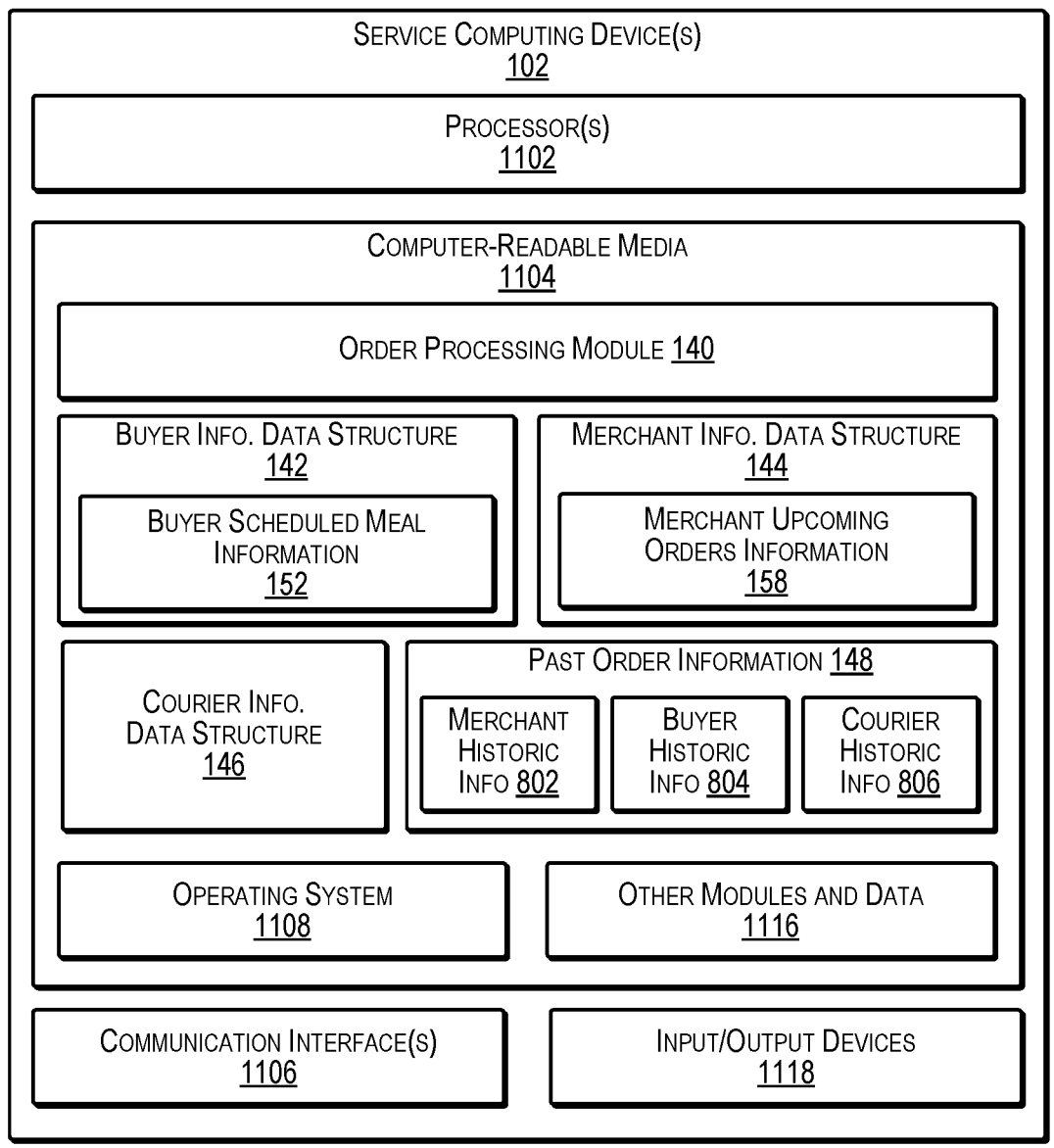
FIG. 11 illustrates select components of one or more example service computing devices according to some implementations.

FIG. 11 illustrates select components of the service computing device 102 according to some implementations. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1104 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure the one or more processors 1102 to perform the actions attributed above to the service computing device 102. Functional components stored in the computer-readable media 1104 may include the order processing program 140. Additional functional components stored in the computer-readable media 1104 may include an operating system 1108 for controlling and managing various functions of the service computing device 102.

In addition, the computer-readable media 1104 may store data used for performing the operations described herein. Thus, the computer-readable media 1104 may store the buyer information data structure 142 including buyer scheduled meal information 152; the merchant information data structure 144, including the merchant upcoming orders information 158; the courier information data structure 146; and the past order information data structure 146, which may include the merchant historic information 802, the buyer historic information 804, and the courier historic information 806. The service computing device 102 may also include or maintain other functional components and data not specifically shown in FIG. 11, such as other modules and data 1116, which may include programs, drivers, etc., and the data used or generated by the functional components. Further, the service computing device 102 may include many other logical, programmatic and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The service computing device 102 may further be equipped with various input/output (I/O) devices 1118. Such I/O devices 1118 may include a display, various user interface controls (e.g., buttons, joystick, keyboard, mouse, touch screen, etc.), audio speakers, connection ports and so forth.

Figure 12:
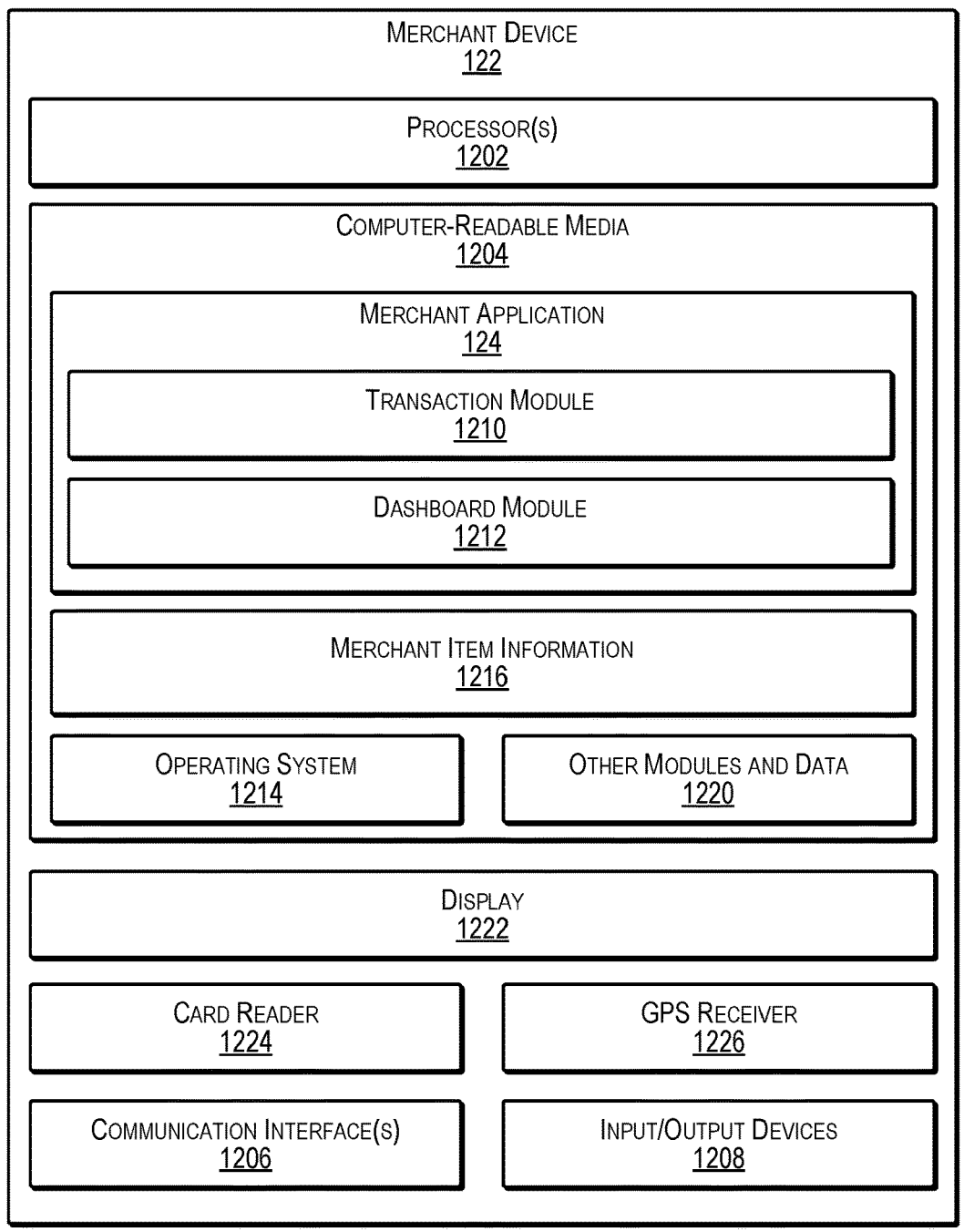
FIG. 12 illustrates select components of an example merchant device according to some implementations.

FIG. 12 illustrates select example components of an example merchant device 122 according to some implementations. The merchant device 122 may be any suitable type of computing device, e.g., portable, semi-portable, semi-stationary, or stationary. Some examples of the merchant device 122 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 122 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or otherwise configured to execute the algorithms and processes described herein. The processor 1202 can be configured to fetch and execute computer-readable processor-executable instructions stored in the computer-readable media 1204.

Depending on the configuration of the merchant device 122, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 122 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 122. Functional components of the merchant device 122 stored in the computer-readable media 1204 may include the merchant application 124. In this example, the merchant application 124 includes a transaction module 1210 and a dashboard module 1212. For example, the transaction module 1210 may present an interface, such as a payment interface, to enable the merchant to conduct transactions, receive payments, and so forth, as well as for communicating with the service computing device 102 for receiving orders, sending order confirmations, processing payments, and sending transaction information. Further, the dashboard module 1212 may present a setup interface to enable the merchant to setup menu items, such as for adding new menu items to a menu, modifying information for existing menu items, and so forth. The dashboard module 1212 may further enable the merchant to manage the merchant's account, such as for viewing the merchant's account, controlling the merchant's preferences, reviewing saved or new item information, and the like. Additional functional components may include an operating system 1214 for controlling and managing various functions of the merchant device 122 and for enabling basic user interactions with the merchant device 122.

In addition, the computer-readable media 1204 may also store data, data structures, and the like, that are used by the functional components. For example, data stored by the computer-readable media 1204 may include merchant item information 1216 that includes the item information about the menu items offered by the merchant, which may include a menu or other list of menu items currently available from the merchant, images of the menu items, descriptions of the menu items, prices of the menu items, ingredients, nutritional information, and so forth. Depending on the type of the merchant device 122, the computer-readable media 1204 may also optionally include other functional components and data, such as other modules and data 1220, which may include programs, drivers, etc., and the data used or generated by the functional components. Further, the merchant device 122 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 12 further illustrates that the merchant device 122 may include a display 1222, which in some cases may include an integral touchscreen. The merchant device 122 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 122 may include or may be connectable to a card reader 1224. In some examples, the card reader 1224 may plug into a port in the merchant device 122, such as a microphone/headphone port, a data port, or other suitable port. The card reader 1224 may include a read head for reading a magnetic strip of a payment card, and further may include encryption technology for encrypting the information read from the magnetic strip. Alternatively, numerous other types of card readers may be employed with the merchant device 122 herein, depending on the type and configuration of the merchant device 122.

Other components included in the merchant device 122 may include various types of sensors, which may include a GPS receiver 1226 able to indicate merchant location information, as well as other sensors (not shown) such as an accelerometer, gyroscope, compass, proximity sensor, and the like. Additionally, the merchant device 122 may include various other components that are not shown, examples of which include removable storage, a power source, such as a battery and power control unit, and so forth.

Figure 13:
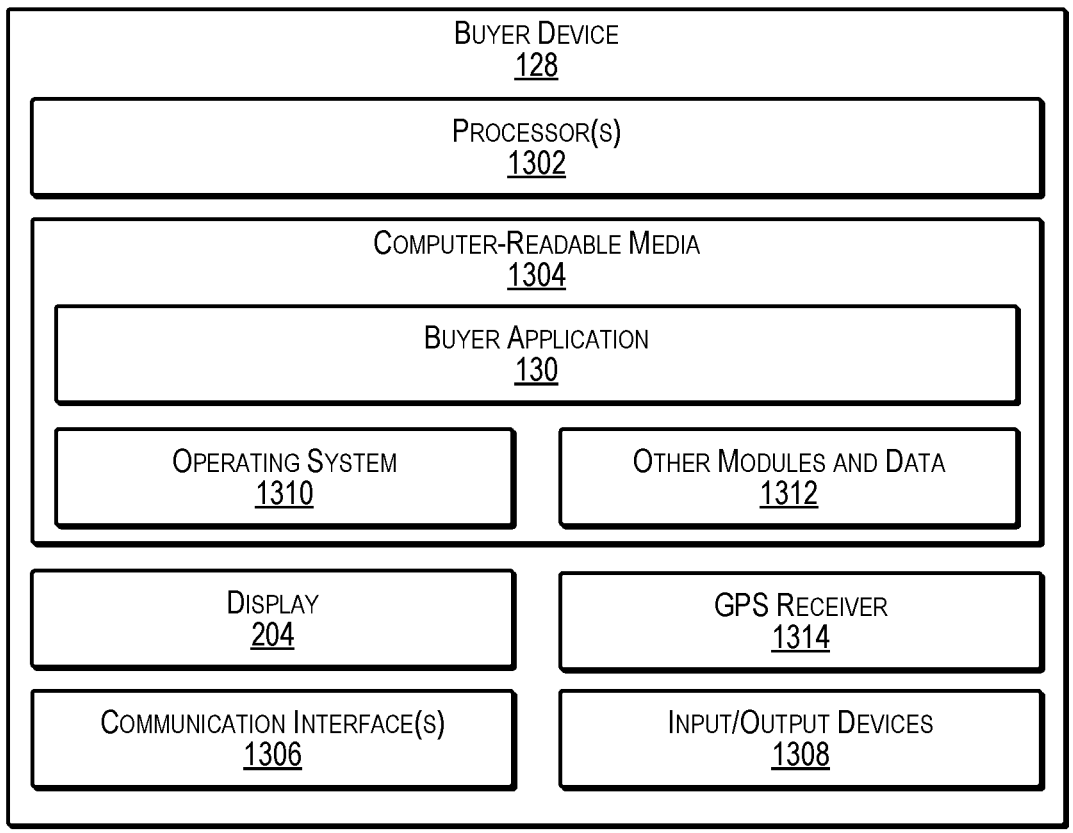
FIG. 13 illustrates select components of an example buyer device according to some implementations.

FIG. 13 illustrates select example components of the buyer device 128 that may implement the functionality described above according to some examples. The buyer device 128 may be any of a number of different types of portable computing devices. Some examples of the buyer device 128 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 128 may be a stationary or semi-stationary computing device, such as a desktop computer or other device with computing capabilities.

In the example of FIG. 13, the buyer device 128 includes components such as at least one processor 1302, one or more computer-readable media 1304, one or more communication interfaces 1306, and one or more input/output (I/O) devices 1308. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 128, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 128 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 128. Functional components of the buyer device 128 stored in the computer-readable media 1304 may include the buyer application 130, as discussed above, which may present the buyer with one or more GUIs for placing an order, viewing scheduled meals, etc., some examples of which are described above. Additional functional components may include an operating system 1310 for controlling and managing various functions of the buyer device 128 and for enabling basic user interactions with the buyer device 128.

In addition, the computer-readable media 1304 may also store data, data structures and the like, that are used by the functional components. Depending on the type of the buyer device 128, the computer-readable media 1304 may also optionally include other functional components and data, such as other modules and data 1312, which may include applications, programs, drivers, etc., and the data used or generated by the functional components. Further, the buyer device 128 may include many other logical, programmatic and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 13 further illustrates that the buyer device 128 may include the display 204. Depending on the type of computing device used as the buyer device 128, the display 204 may employ any suitable display technology. In some examples, the display 204 may have a touch sensor associated with the display 204 to provide a touchscreen display configured to receive touch inputs for enabling interaction with a GUI(s) presented on the display 204. Accordingly, implementations herein are not limited to any particular display technology. Alternatively, in some examples, the buyer device 128 may not include a display.

The buyer device 128 may further include the one or more I/O devices 1308. The I/O devices 1308 may include speakers, a microphone, a camera, and various user controls (e.g., buttons, a joystick, a keyboard, a keypad, etc.), a haptic output device, and so forth. Other components included in the buyer device 128 may include various types of sensors, which may include a GPS receiver 1314 able to indicate location information, as well as other sensors (not shown) such as an accelerometer, gyroscope, compass, proximity sensor, and the like. In some cases, the GPS receiver 1314 may be used by the buyer application 130 to determine a current geographic location of the buyer device 128. Additionally, or alternatively, the communication interfaces 1306 may be used to determine the current location of the buyer device, such as based on communication with nearby cell towers, wireless access points, and the like. In some examples, the buyer application 130 may send this location information to the service computing device as an indicated delivery location for the associated buyer. Additionally, the buyer device 128 may include various other components that are not shown, examples of which include removable storage, a power source, such as a battery and power control unit, and so forth.

Furthermore, the courier device 134 discussed above, e.g., with respect to FIG. 1 may have a hardware configuration similar to that of the buyer device 128, but with different functional components. For example, the courier device 134 may include the courier application 136 instead of, or in addition to, the buyer application 130.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media including instructions executable by a service computing device of a service provider to configure the service computing device to perform operations comprising:

receiving, by the service computing device, from a buyer application executing on a buyer device, an indication that a buyer has accessed the buyer application on the buyer device and has selected, via a user interface presented by the buyer application, information related to a menu item offered by a first merchant of a plurality of merchants, wherein the buyer application is associated with the service provider and enables the service provider to present offerings of the plurality of merchants through the buyer application on the buyer device, the buyer application including functionality for ordering respective menu items from respective merchants of the plurality of merchants;

based at least on receiving the indication that the buyer has selected the information related to the menu item offered by the first merchant, sending, by the service computing device, a first communication to a merchant application executing on a merchant computing device associated with the first merchant, the first communication including an instruction to cause the merchant application on the merchant computing device to determine and provide an indication of a current backlog of orders to be prepared by the first merchant, wherein the current backlog of orders indicates at least an amount of time for preparing prepared versions of menu items for orders received and to be prepared by the first merchant, wherein the merchant application is associated with the service provider and enables the first merchant to receive buyer orders via the service provider;

based at least partially on receiving a second communication from the merchant application indicating the current backlog of orders to be prepared by the first merchant, comparing, by the service computing device, the current backlog of orders with a backlog threshold to determine that the current backlog of orders exceeds the backlog threshold;

based at least on determining that the current backlog of orders exceeds the backlog threshold, sending, by the service computing device, to the buyer application, updated item information that causes the buyer application to present, in the user interface, the updated item information indicating availability of a meal kit version of the menu item offered by the first merchant in addition to a prepared version of the menu item, wherein the user interface indicates that the meal kit version of the menu item is currently available for order with a first delivery time, and that the prepared version of the menu item is available for order with a longer second delivery time determined based in part on the current backlog received from the first merchant;

receiving, by the service computing device, from the buyer application, a selection received via the user interface indicating an order for the meal kit version of the menu item; and sending, by the service computing device, a third communication to the merchant application to indicate the order for the meal kit version of the menu item.

2. The one or more non-transitory computer-readable media as recited in claim 1, the operations further comprising determining that the current backlog exceeds the backlog threshold based on at least one of:

a total number of orders at for the prepared versions of menu items to be prepared by the first merchant;

a total estimated preparation time for the orders for the prepared versions of menu items to be prepared by at the first merchant; or a predicted preparation start time received from the first merchant for the prepared version of the menu item.

3. The one or more non-transitory computer-readable media as recited in claim 1, the operations further comprising calculating an amount of time of the longer second delivery time based at least in part on the current backlog of the first merchant, wherein the item information causes the buyer application to present the amount of time of the longer second delivery time in the user interface.

4. The one or more non-transitory computer-readable media as recited in claim 1, wherein the item information causes the buyer application to dynamically update the user interface to include a virtual control for selecting the meal kit version of the menu item.

5. The one or more non-transitory computer-readable media as recited in claim 1, wherein the backlog threshold is a first backlog threshold, the operations further comprising:

subsequent to sending the third communication, receiving, by the service computing device, from an instance of the buyer application executing on another buyer device, an indication that another buyer has selected, via a user interface presented by the instance of the buyer application on the other buyer device, information related to another menu item offered by the first merchant;

based on receiving the indication from the other buyer device, sending, by the service computing device, a fourth communication to the merchant computing device to cause the merchant application on the merchant computing device to determine and provide an indication of an updated current backlog of prepared versions of menu items to be prepared by the first merchant;

based at least on sending the fourth communication, receiving, by the service computing device, a fifth communication from the merchant application including the updated current backlog indicating an increase in the merchant's backlog;

comparing, by the service computing device, the updated current backlog with a second backlog threshold to determine that the updated current backlog exceeds the second backlog threshold, wherein the second backlog threshold corresponds to a larger backlog than the first backlog threshold; and based at least on the updated current backlog exceeding the second backlog threshold sending, by the service computing device, to the other buyer device, item information that causes the instance of the buyer application to present, in the user interface on the other buyer device, information indicating availability of the meal kit version of the other menu item offered by the first merchant and unavailability of the prepared version of the other menu item, the item information causing the user interface presented by the instance of the buyer application on the other buyer device to indicate that the meal kit version of the menu item is currently available for order and that the prepared version of the menu item is unavailable for order.

6. The one or more non-transitory computer-readable media as recited in claim 1, the operations further comprising sending, by the service computing device, a communication to a courier device associated with a courier to instruct the courier to deliver the meal kit version of the menu item to a delivery location indicated by the buyer.

7. A method comprising:
receiving, by one or more processors associated with a service provider, from a buyer application executing on a buyer device, an indication that a buyer has accessed, via a user interface presented by the buyer application, information related to a menu item offered by a first merchant of a plurality of merchants, wherein the buyer application is associated with the service provider and enables the service provider to present offerings of the plurality of merchants through the buyer application on the buyer device, the buyer application including functionality for ordering respective menu items from respective merchants of the plurality of merchants;

based at least on receiving the indication that the buyer has accessed the information related to the menu item offered by the first merchant, sending, by the one or more processors, a first communication to a merchant application executing on a merchant computing device associated with the first merchant, the first communication including an instruction to cause the merchant application on the merchant computing device to determine and provide an indication of a current backlog of orders to be prepared by the first merchant, wherein the current backlog of orders indicates at least an amount of time for preparing prepared versions of menu items for orders received and to be prepared by the first merchant, wherein the merchant application is associated with the service provider and enables the first merchant to receive buyer orders via the service provider;

based at least partially on receiving a second communication from the merchant application indicating the current backlog of orders to be prepared by the first merchant, comparing, by the one or more processors, the current backlog of orders with a backlog threshold to determine that the current backlog of orders exceeds the backlog threshold;

based at least on determining that the current backlog of orders exceeds the backlog threshold, sending, by the one or more processors, to the buyer application, updated item information that causes the buyer application to present, in the user interface, the updated item information indicating availability of a meal kit version of the menu item offered by the first merchant in addition to a prepared version of the menu item, wherein the user interface indicates that the meal kit version of the menu item is currently available for order with a first delivery time, and that the prepared version of the menu item is available for order with a longer second delivery time determined based in part on the current backlog received from the first merchant;

receiving, by the one or more processors, from the buyer application, a selection received via the user interface indicating an order for the meal kit version of the menu item; and sending, by the one or more processors, a third communication to the merchant application to indicate the order for the meal kit version of the menu item.

8. The method as recited in claim 7, wherein the sending the item information to the buyer application, causes the buyer application to present, in the user interface, an indication that the prepared version of the menu item is available for order with the longer second delivery time determined based at least in part on a preparation time of the prepared version of the menu item plus at least the amount of time for preparing the prepared versions of menu items for the orders already received and to be prepared by the first merchant, as indicated by the current backlog.

9. The method as recited in claim 7, wherein sending the updated item information to the buyer application, causes the buyer application to present, in the user interface, an indication that at least one of the meal kit version of the menu item or the prepared version of the menu item is available for fulfilment by delivery and takeout.

10. The method as recited in claim 7, further comprising determining that the current backlog exceeds the backlog threshold based on at least one of:
a total number of orders for the prepared versions of menu items to be prepared by the first merchant;
a total estimated preparation time for the prepared versions of menu items to be prepared by the first merchant; or
a predicted preparation start time received from the first merchant for the prepared version of the menu item.

11. The method as recited in claim 7, further comprising calculating an amount of time of the longer second delivery time based at least in part on a predicted start time for preparation of the prepared version of the menu item indicated by the current backlog of the first merchant.

12. The method as recited in claim 7, wherein sending the updated item information causes the buyer application to dynamically update the user interface to include a virtual control for selecting the meal kit version of the menu item.

13. The method as recited in claim 7, wherein the backlog threshold is a first backlog threshold, the method further comprising:
subsequent to sending the third communication, receiving, by the one or more processors, from an instance of the buyer application executing on another buyer device, an indication that another buyer has selected, via a user interface presented by the instance of the buyer application on the other buyer device, information related to another menu item offered by the first merchant;

based on receiving the indication from the other buyer device, sending, by the one or more processors, a fourth communication to the merchant computing device to cause the merchant application on the merchant computing device to determine and provide an indication of an updated current backlog of prepared versions of menu items to be prepared by the first merchant;

based at least on sending the fourth communication, receiving, by the one or more processors, a fifth communication from the merchant application including the updated current backlog indicating an increase in the merchant's backlog;

comparing, by the one or more processors, the updated current backlog with a second backlog threshold to determine that the updated current backlog exceeds the second backlog threshold, wherein the second backlog threshold corresponds to a larger backlog than the first backlog threshold; and based at least on the updated current backlog exceeding the second backlog threshold sending, by the one or more processors, to the other buyer device, item information that causes the instance of the buyer application to present, in the user interface on the other buyer device, information indicating availability of the meal kit version of the other menu item offered by the first merchant and unavailability of the prepared version of the other menu item, the item information causing the user interface presented by the instance of the buyer application on the other buyer device to indicate that the meal kit version of the menu item is currently available for order and that the prepared version of the menu item is unavailable for order.

14. A system comprising:

one or more processors associated with a service provider and configured by executable instructions to perform operations comprising:

receiving, by the one or more processors, from a buyer application executing on a buyer device, an indication that a buyer has accessed, via a user interface presented by the buyer application, information related to a menu item offered by a first merchant of a plurality of merchants, wherein the buyer application is associated with the service provider and enables the service provider to present offerings of the plurality of merchants through the buyer application on the buyer device, the buyer application including functionality for ordering respective menu items from respective merchants of the plurality of merchants;

based at least on receiving the indication that the buyer has accessed the information related to the menu item offered by the first merchant, sending, by the one or more processors, a first communication to a merchant application executing on a merchant computing device associated with the first merchant, the first communication including an instruction to cause the merchant application on the merchant computing device to determine and provide an indication of a current backlog of orders to be prepared by the first merchant, wherein the current backlog of orders indicates at least an amount of time for preparing prepared versions of menu items for orders received and to be prepared by the first merchant, wherein the merchant application is associated with the service provider and enables the first merchant to receive buyer orders via the service provider;

based at least partially on receiving a second communication from the merchant application indicating the current backlog of orders to be prepared by the first merchant, comparing, by the one or more processors, the current backlog of orders with a backlog threshold to determine that the current backlog of orders exceeds the backlog threshold;

based at least on determining that the current backlog of orders exceeds the backlog threshold, sending, by the one or more processors, to the buyer application, updated item information that causes the buyer application to present, in the user interface, the updated item information indicating availability of a meal kit version of the menu item offered by the first merchant in addition to a prepared version of the menu item, wherein the user interface indicates that the meal kit version of the menu item is currently available for order with a first delivery time, and that the prepared version of the menu item is available for order with a longer second delivery time determined based in part on the current backlog received from the first merchant;

receiving, by the one or more processors, from the buyer application, a selection received via the user interface indicating an order for the meal kit version of the menu item; and sending, by the one or more processors, a third communication to the merchant application to indicate the order for the meal kit version of the menu item.

15. The system as recited in claim 14, wherein the sending the item information to the buyer application, causes the buyer application to present, in the user interface, an indication that the prepared version of the menu item is available for order with the longer second delivery time determined based at least in part on a preparation time of the prepared version of the menu item plus at least the amount of time for preparing the prepared versions of menu items for the orders already received and to be prepared by the first merchant, as indicated by the current backlog.

16. The system as recited in claim 14, wherein the sending the updated item information to the buyer application, causes the buyer application to present, in the user interface, an indication that at least one of the meal kit version of the menu item or the prepared version of the menu item is available for fulfilment by delivery and takeout.

17. The system as recited in claim 14, the operations further comprising determining that the current backlog exceeds the backlog threshold based on at least one of:

a total number of orders for the prepared versions of menu items to be prepared by the first merchant;

a total estimated preparation time for the prepared versions of menu items to be prepared by the first merchant; or a predicted preparation start time received from the first merchant for the prepared version of the menu item.

18. The system as recited in claim 14, the operations further comprising calculating an amount of time of the longer second delivery time based at least in part on a predicted start time for preparation of the prepared version of the menu item indicated by the current backlog of the first merchant.

19. The system as recited in claim 14, wherein sending the updated item information causes the buyer application to dynamically update the user interface to include a virtual control useable for selecting the meal kit version of the menu item.

20. The system as recited in claim 14, wherein the backlog threshold is a first backlog threshold, the operations further comprising:

subsequent to sending the third communication, receiving, by the one or more processors, from an instance of the buyer application executing on another buyer device, an indication that another buyer has selected, via a user interface presented by the instance of the buyer application on the other buyer device, information related to another menu item offered by the first merchant;

based on receiving the indication from the other buyer device, sending, by the one or more processors, a fourth communication to the merchant computing device to cause the merchant application on the merchant computing device to determine and provide an indication of an updated current backlog of prepared versions of menu items to be prepared by the first merchant;

based at least on sending the fourth communication, receiving, by the one or more processors, a fifth communication from the merchant application including the updated current backlog indicating an increase in the merchant's backlog;

comparing, by the one or more processors, the updated current backlog with a second backlog threshold to determine that the updated current backlog exceeds the second backlog threshold, wherein the second backlog threshold corresponds to a larger backlog than the first backlog threshold; and based at least on the updated current backlog exceeding the second backlog threshold sending, by the one or more processors, to the other buyer device, item information that causes the instance of the buyer application to present, in the user interface on the other buyer device, information indicating availability of the meal kit version of the other menu item offered by the first merchant and unavailability of the prepared version of the other menu item, the item information causing the user interface presented by the instance of the buyer application on the other buyer device to indicate that the meal kit version of the menu item is currently available for order and that the prepared version of the menu item is unavailable for order.

* * * * *